United States Patent
Kato et al.

(10) Patent No.: US 10,776,934 B2
(45) Date of Patent: Sep. 15, 2020

(54) MOVEMENT AMOUNT DETECTING DEVICE, IMAGE FORMING APPARATUS, AND MOVEMENT AMOUNT DETECTING METHOD

(71) Applicant: KONICA MINOLTA, INC., Chiyoda-ku, Tokyo (JP)

(72) Inventors: Takaki Kato, Hachioji (JP); Yuji Kobayashi, Toyohashi (JP); Masayuki Fukunaga, Toyohashi (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/812,709

(22) Filed: Nov. 14, 2017

(65) Prior Publication Data
US 2018/0144484 A1  May 24, 2018

(30) Foreign Application Priority Data
Nov. 21, 2016  (JP) .................. 2016-225816

(51) Int. Cl.
  *G06T 7/262*  (2017.01)
  *G06T 7/00*  (2017.01)
  *H04N 1/00*  (2006.01)

(52) U.S. Cl.
CPC ........... *G06T 7/262* (2017.01); *G06T 7/97* (2017.01); *H04N 1/00251* (2013.01);
(Continued)

(58) Field of Classification Search
None
See application file for complete search history.

(56) References Cited

U.S. PATENT DOCUMENTS 4,875,769 A * 10/1989 Linebarger ............... G01P 3/36
                                                                 356/28
8,587,774 B2  11/2013 Funato et al.
(Continued)

FOREIGN PATENT DOCUMENTS

JP          62090541 A      4/1987
JP        2001074839 A      3/2001
(Continued)

OTHER PUBLICATIONS

Yasuhiko Arai, et al., "High Resolution Electronic Speckle Pattern Interferometry by Using Only Two Speckle Patterns," Kogaku, vol. 41, No. 2, Feb. 2012, pp. 96-104.
(Continued)

*Primary Examiner* — Fan Zhang
(74) *Attorney, Agent, or Firm* — Holtz, Holtz & Volek PC

(57) ABSTRACT

A movement amount detecting device performs discrete Fourier transform onto N-th image data and N+1-th image data, thereby generating N-th wave number space data and N+1-th wave number space data. The movement amount detecting device obtains a target speed of a sheet, and determines a cutoff value based on the obtained target speed and an exposure time in an image sensor. The movement amount detecting device calculates an amount of movement of the sheet based on a phase difference between the N-th wave number space data and the N+1-th wave number space data in a wave number component smaller than the cutoff value.

20 Claims, 15 Drawing Sheets

(52) U.S. Cl.
CPC ..... *H04N 1/00705* (2013.01); *H04N 1/00734* (2013.01); *G06T 2207/10016* (2013.01); *G06T 2207/20024* (2013.01); *G06T 2207/20056* (2013.01); *H04N 2201/0094* (2013.01)

(56) References Cited

U.S. PATENT DOCUMENTS

| | | | |
|---|---|---|---|
| 2004/0238764 A1* | 12/2004 | Yagaguchi | B41J 11/0095 250/559.19 |
| 2008/0252896 A1* | 10/2008 | Hayashihara | G03G 15/657 356/450 |
| 2010/0310284 A1* | 12/2010 | Funato | G01P 3/68 399/302 |
| 2016/0162755 A1* | 6/2016 | Nagai | G01B 11/254 382/190 |

FOREIGN PATENT DOCUMENTS

| | | | |
|---|---|---|---|
| JP | 2010055064 A | | 3/2010 |
| JP | 2982990 | * | 2/2016 |

OTHER PUBLICATIONS

Chinese Office Action (and English language translation thereof) dated Jan. 25, 2019 issued in counterpart Chinese Application No. 201711143705.9.

* cited by examiner

ONE PIXEL = 10 μm

| EXPOSURE TIME (μs) | TARGET SPEED (mm/s) | AMOUNT OF IMAGE CHANGE (μm) | AMOUNT OF IMAGE CHANGE (PIXEL) |
|---|---|---|---|
| 100 | 100 | 10 | 1.0 |
| | 150 | 15 | 1.5 |
| | 300 | 30 | 3.0 |

MOVEMENT AMOUNT DETECTING DEVICE, IMAGE FORMING APPARATUS, AND MOVEMENT AMOUNT DETECTING METHOD

Japanese Patent Application No. 2016-225816 filed on Nov. 21, 2016, including description, claims, drawings, and abstract the entire disclosure is incorporated herein by reference in its entirety.

BACKGROUND

Technological Field

The present disclosure relates to a movement amount detecting device, an image forming apparatus, and a movement amount detecting method, by each of which an amount of movement of a movable object is detected.

Description of the Related Art

An electrophotographic type image forming apparatus has been pervasive. As a printing process, a general electrophotographic type image forming apparatus performs: adhering toner to an electrostatic latent image on a photoconductor; primarily transferring a toner image on the photoconductor to a transfer belt; secondarily transferring the toner image on the transfer belt to a sheet (for example, a sheet of paper); and fixing the toner image to the sheet using a fixing device.

Here, when a movement speed of a movable object such as the photoconductor, the transfer belt, or the sheet is deviated, transfer deviation takes place. The transfer deviation leads to color deviation.

To address this, the deviation of the movement speed has been adjusted by detecting an amount of movement of the movable object per unit lime and controlling a driving source for moving the movable object in accordance with the detected amount of movement.

As a method of detecting the amount of movement of such a movable object, the following method has been known: laser light is emitted to the movable object, images each including a speckle pattern produced in the light reflected from the movable object are obtained at a certain interval, and two obtained images are analyzed, thereby calculating the amount of movement. Such a method is disclosed in, for example, "Yasuhiko ARAI, et. al., "High Resolution Electronic Speckle Pattern Interferometry by Using Only Two Speckle Patterns", "Kogaku", Volume 41, Number 2, p 96-104, February, 2012", Japanese Laid-Open Patent Publication No. 2010-55064, and Japanese Laid-Open Patent Publication No. 62-90541. Meanwhile, a method of detecting an amount of movement using a Doppler effect has been also known (see Japanese Laid-Open Patent Publication No. 2001-74839).

An image including a speckle pattern includes a wave number component of noise. When the wave number component of noise is used, an error is caused in a result of detection of the amount of movement. Therefore, in order to prevent accuracy of measurement from being decreased due to the noise, Japanese Laid-Open Patent Publication No. 62-90541 describes that the amount of movement is calculated based on a speckle signal having passed through a low-pass filter.

SUMMARY

The wave number of the speckle pattern may be varied according to the movement speed of the movable object. Accordingly, the wave number of noise to be removed may also be varied according to the movement speed.

Japanese Laid-Open Patent Publication No. 62-90541 describes that the cut-off wave number of a low-pass filler is changed in accordance with a movement speed obtained from a result of measurement. Specifically, the cut-off wave number is determined in accordance with the movement speed from the result of measurement, and the amount of movement per unit time is measured again using the determined cut-off wave number. This process is repeated until results of measurement are converged.

However, a movement speed of a photoconductor, a transfer belt, or a sheet in an image forming apparatus is selected from a plurality of greatly different values depending on a situation. For example, there is an image forming apparatus having an ultra high-speed mode of 300 mm/s, a high-speed mode of 150 mm/s, and a normal mode of 100 mm/s. In accordance with a type of sheet or the like, one of the modes is selected for printing. When the movement speed of the movable object is thus greatly changed, with the technique of Japanese Laid-Open Patent Publication No. 62-90541, it takes time until results of measurement are converged, disadvantageously. Otherwise, the results of measurement may not be converged, with the result that the amount of movement per unit time cannot be correctly measured.

The present disclosure has been made to solve the above-described problems, and an object thereof in a certain aspect is to provide a movement amount detecting device, an image forming apparatus, and a movement amount detecting method, by each of which an amount of movement of a movable object can be accurately measured in a short time.

To achieve at least one of the abovementioned objects, according to an aspect of the present invention, a movement amount detecting device reflecting one aspect of the present invention comprises: an image capturer that generates first image data and second image data by capturing images of a movable object at different timings during movement of the movable object; and a hardware processor. The hardware processor generates first wave number space data by performing discrete Fourier transform onto the first image data and generates second wave number space data by performing discrete Fourier transform onto the second image data; obtains a target speed of the movable object and determines a cutoff value based on the obtained target speed and an exposure time in the image capturer; and calculates an amount of movement of the movable object based on a phase difference between the first wave number space data and the second wave number space data in a wave number component smaller than the cutoff value.

To achieve at least one of the abovementioned objects, according to an aspect of the present invention, an image forming apparatus reflecting one aspect of the present invention comprises: a conveyer that conveys a recording medium; a transfer belt on which a toner image is formable, the transfer belt transferring the toner image onto the recording medium; and the above-described movement amount detecting device. The movable object is one of the recording medium, the conveyer, and the transfer belt.

To achieve at least one of the abovementioned objects, according to an aspect of the present invention, a movement amount detecting method reflecting one aspect of the present invention comprise generating first image data and second image data by capturing images of a movable object at different timings during movement of the movable object. The movement amount detecting method comprises generating first wave number space data by performing discrete Fourier transform onto the first image data and generating second wave number space data by performing discrete Fourier transform onto the second image data. The movement amount detecting method comprises obtaining a target speed of the movable object and determining a cutoff value based on the obtained target speed and an exposure time in the image capturing for generating the first image data and the second image data. The movement amount detecting method comprises calculating an amount of movement of the movable object based on a phase difference between the first wave number space data and the second wave number space data in a wave number component smaller than the cutoff value.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
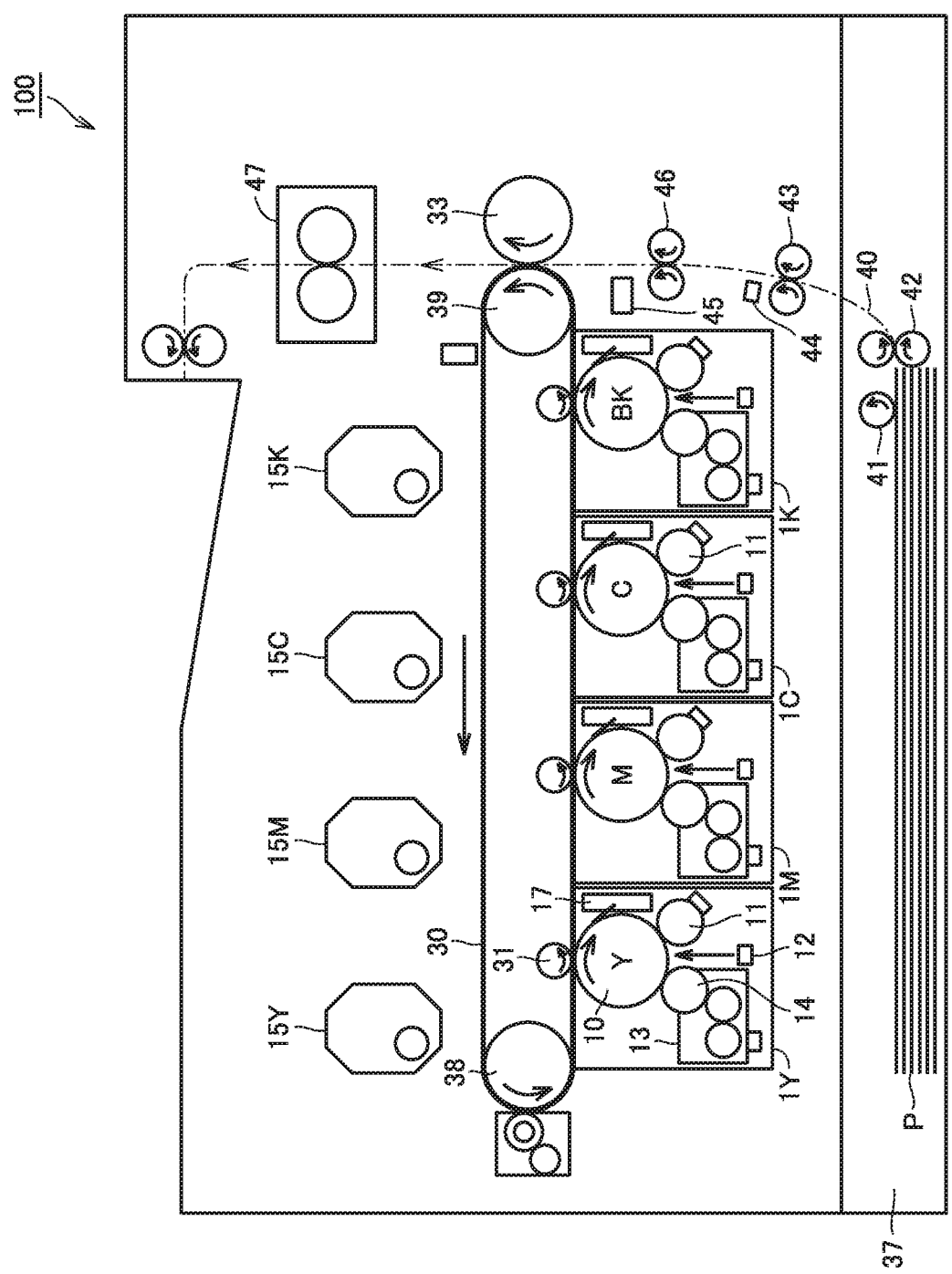
FIG. 1 shows an exemplary internal structure of an image forming apparatus of a first embodiment.

Hereinafter, one or more embodiments of the present invention will be described with reference to the drawings. However, the scope of the invention is not limited to the disclosed embodiments.

In the following, each of embodiments according to the present disclosure will be described with reference to the drawings. In the description below, the same reference characters are given to the same parts and components. Their designations and functions are also the same. Hence, they will not be described in detail repeatedly. It should be noted that the embodiments and modifications below may be selectively combined appropriately.

First Embodiment

[Internal Configuration of Image Forming Apparatus]

With reference to FIG. 1, the following describes an image forming apparatus 100 including a movement amount detecting device 45. FIG. 1 shows an exemplary internal structure of image forming apparatus 100.

FIG. 1 shows image forming apparatus 100 serving as a color printer. In the description below, image forming apparatus 100 serving as a color printer will be described; however, image forming apparatus 100 is not limited to such a color printer. For example, image forming apparatus 100 may be a multi-functional peripheral (MFP).

Image forming apparatus 100 includes image forming units 1Y, 1M, 1C, 1K, a transfer belt 30, a primary transfer roller 31, a secondary transfer roller 33, a cassette 37, a follower roller 38, a drive roller 39, a pickup roller 41, a feed roller 42, a conveying roller 43, a sheet detecting sensor 44, a timing roller 46, movement amount detecting device 45, and a fixing device 47. Further, although not shown in FIG. 1, image forming apparatus 100 includes an engine control substrate (described later) that controls an operation of image forming apparatus 100.

Image forming units 1Y, 1M, 1C, 1K are arranged in this order along transfer belt 30. Image forming unit 1Y receives toner supplied from a toner bottle 15Y and forms a yellow (Y) toner image. Image forming unit 1M receives toner supplied from a toner bottle 15M and forms a magenta (M) toner image. image forming unit 1C receives toner supplied from a toner bottle 15C and forms a cyan (C) toner image. image forming unit 1K receives toner supplied from a toner bottle 15K and forms a black (BK) toner image.

Image forming units 1Y, 1M, 1C, 1K are arranged along transfer belt 30 in this order in a direction of rotation of transfer belt 30. Each of image forming units 1Y, 1M, 1C, 1K includes a photoconductor 10, a charging device 11, an exposing device 12, a developing device 13, and a cleaning device 17.

Charging device 11 uniformly charges a surface of photoconductor 10. Exposing device 12 emits laser light to photoconductor 10 in response to a control signal from a below-described controller 71 to expose the surface of photoconductor 10 in accordance with an input image pattern. Accordingly, an electrostatic latent image according to the input image is formed on photoconductor 10.

Developing device 13 applies developing bias to a developing roller 14 while rotating developing roller 14, thus adhering the toner to a surface of developing roller 14. Accordingly, the toner is transferred from developing roller 14 to photoconductor 10, thereby developing a toner image on the surface of photoconductor 10 in accordance with the electrostatic latent image.

Photoconductor 10 is in contact with transfer belt 30 at a portion at which primary transfer roller 31 is provided. Primary transfer roller 31 is configured to be rotatable. When transfer voltage having a polarity opposite to that of the toner image is applied to primary transfer roller 31, the toner image is transferred from photoconductor 10 to transfer belt 30.

The yellow (Y) toner image, the magenta (M) toner image, the cyan (C) toner image, and the black (BK) toner image are transferred from photoconductors 10 to transfer belt 30 and are then laid on one another in this order. Accordingly, a color toner image is formed on transfer belt 30.

Transfer belt 30 is suspended on follower roller 38 and drive roller 39. Drive roller 39 is driven to rotate by a motor (not shown), for example. Transfer belt 30 and follower roller 38 are rotated according to drive roller 39. Accordingly, the toner image on transfer belt 30 is conveyed to secondary transfer roller 33.

Sheets P are set in cassette 37. Each of sheets P is a recording medium such as recording paper. The plurality of sheets P are handled one by one by pickup roller 41.

One sheet P thus handled by pickup roller 41 is sent out to a conveyance path 40 by feed roller 42. Conveying roller 43 conveys sheet P, supplied by feed roller 42, to timing roller 46 that is in a stop slate. The sheet is formed into a loop by timing roller 46 that is in the stop state, and a sheet skew is corrected by the loop. It should be noted that sheet detecting sensor 44 is disposed between conveying roller 43 and timing roller 46 to detect presence/absence of a sheet. Sheet detecting sensor 44 detects arrival of a sheet.

Timing roller 46 conveys sheet P having the corrected sheet skew to secondary transfer roller 33.

Movement amount detecting device 45 is disposed downstream of timing roller 46. Movement amount detecting device 45 detects an amount of movement of sheet P conveyed by timing roller 46 per unit time, and outputs data (hereinafter, referred to as "movement amount data") indicating the detected amount of movement to the engine control substrate described below. It should be noted that the position of movement amount detecting device 45 is not limited to the position shown in FIG. 1 and may be any position at which an image of the surface of conveyed sheet P can be captured. Details of movement amount detecting device 45 will be described later.

As with primary transfer roller 31, secondary transfer roller 33 is also fed with transfer voltage. The toner image conveyed by transfer belt 30 is transferred to sheet P at a nip portion between secondary transfer roller 33 and transfer belt 30, and is fixed onto sheet P by fixing device 47 under heat and pressure.

[Hardware Configuration of Image Forming Apparatus]

Figure 2:
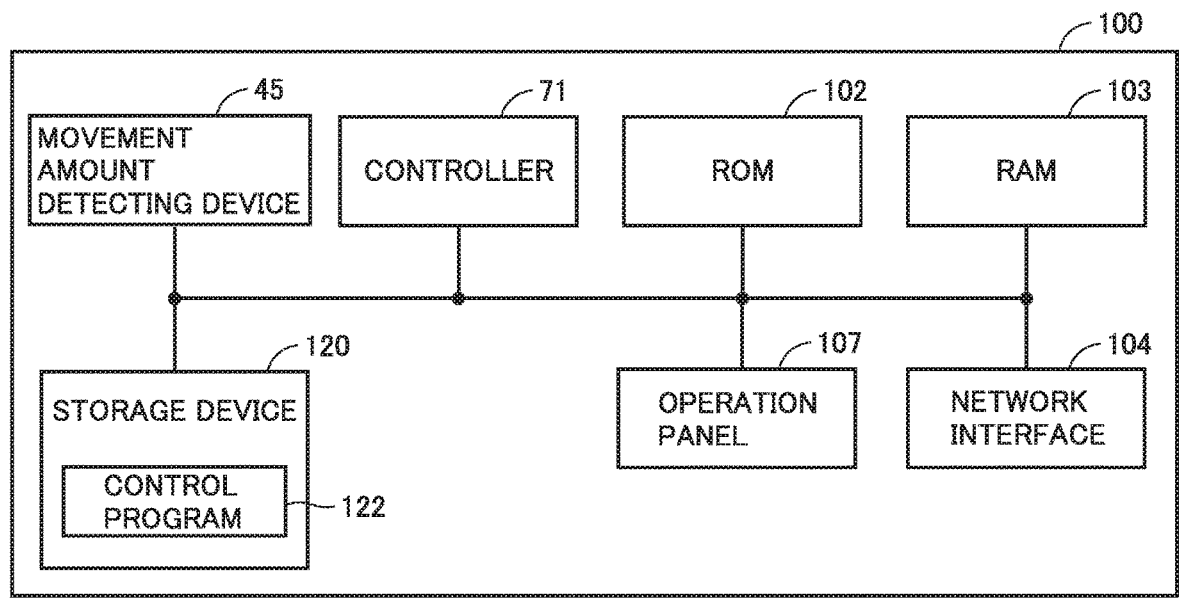
FIG. 2 is a block diagram showing a main hardware configuration of the image forming apparatus of the first embodiment.

With reference to FIG. 2, the following describes an exemplary hardware configuration of image forming apparatus 100. FIG. 2 is a block diagram showing a main hardware configuration of image forming apparatus 100.

As shown in FIG. 2, image forming apparatus 100 includes movement amount detecting device 45, controller 71, and a ROM (Read Only Memory) 102, a RAM (Random Access Memory) 103, a network interface 104, an operation panel 107, and a storage device 120.

Controller 71 is constituted of at least one integrated circuit, for example. For example, the integrated circuit is constituted of at least one CPU, at least one DSP, at least one ASIC (Application Specific Integrated Circuit), at least one FPGA (Field Programmable Gate Array), or a combination thereof.

Controller 71 controls an operation of image forming apparatus 100 by executing a control program 122.

Controller 71 reads control program 122 from storage device 120 to ROM 102 based on reception of art instruction for executing control program 122. RAM 103 functions as a working memory, and temporarily stores various types of data required for execution of control program 122.

An antenna (not shown) or the like is connected to network interface 104. Image forming apparatus 100 exchanges data with an external communication device via the antenna. Examples of the external communication device include a mobile communication terminal such as a smartphone, a server, and the like. Image forming apparatus 100 may be configured to download control program 122 from the server via the antenna.

Operation panel 107 is constituted of a display and a touch panel. The display and the touch panel are laid on each other. Operation panel 107 receives a print operation, a scan operation, and the like for image forming apparatus 100, for example.

Storage device 120 is a storage medium such as a hard disk or an external storage device, for example. Storage device 120 stores control program 122 of image forming apparatus 100, and the like. The location of storage of control program 122 is not limited to storage device 120. Control program 122 may be stored in a storage region of movement amount detecting device 45, a storage region (for example, a cache or the like) of controller 71, ROM 102, RAM 103, an external device (for example, a server), or the like.

Control program 122 may be provided in such a manner that control program 122 is incorporated in a part of an appropriate program, rather than an individual program. In this case, a control process according to the present embodiment is implemented in cooperation with the appropriate program. Such a program that does not include a part of modules is not deviated from the gist of control program 122 according to the present embodiment. Further, a part or whole of functions provided by control program 122 may be implemented by dedicated hardware. Further, image forming apparatus 100 may be configured in a such manner as in a cloud service in which at least one server performs a part of processes of control program 122.

[Internal Configuration of Movement Amount Detecting Device]

Figure 3:
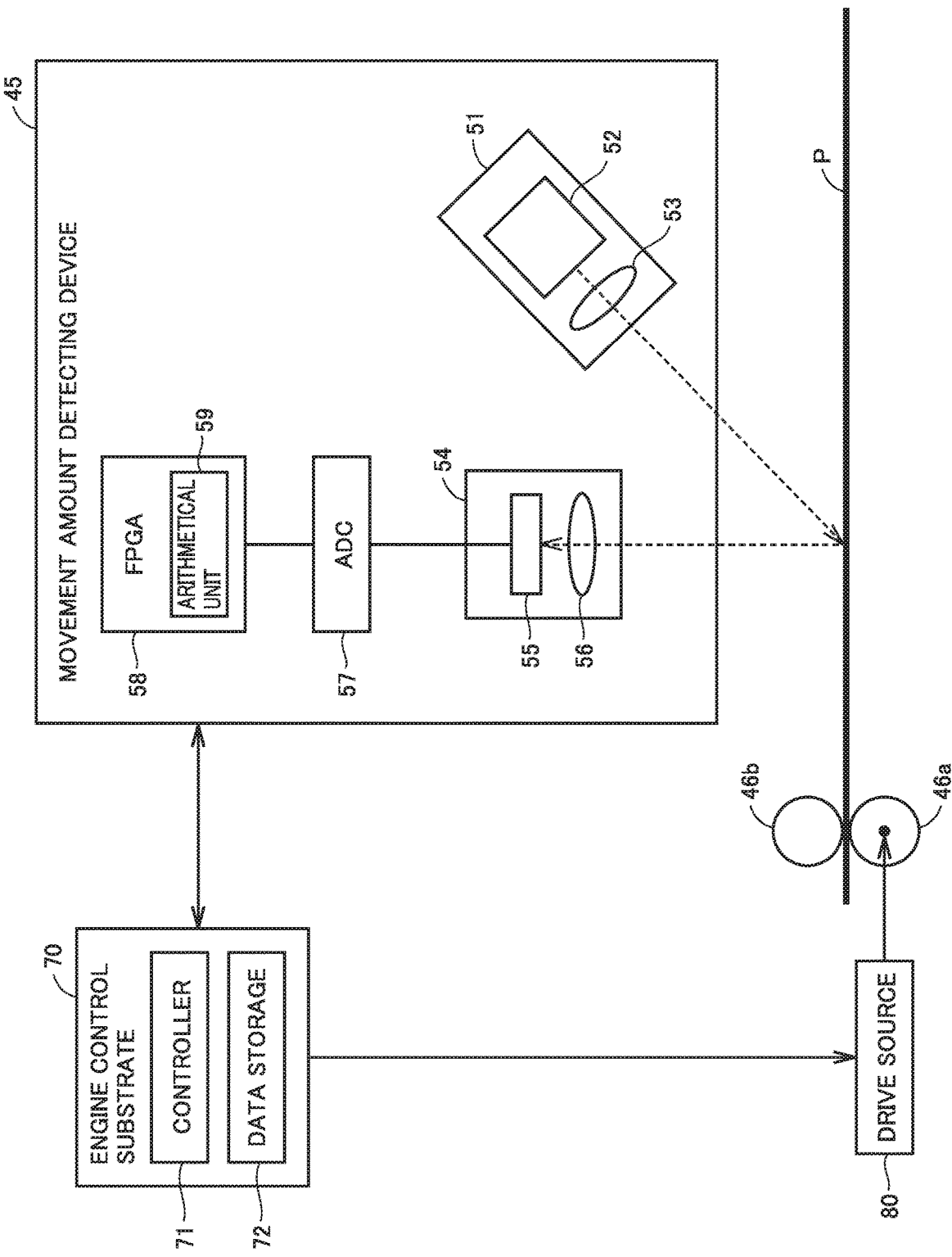
FIG. 3 is a block diagram showing a movement amount detecting device and a configuration around the movement amount detecting device in the first embodiment.

With reference to FIG. 3, the following describes movement amount detecting device 45 and configurations around movement amount detecting device 45. FIG. 3 is a block diagram showing movement amount detecting device 45 and the configurations around movement amount detecting device 45.

As shown in FIG. 3, as the configurations around movement amount detecting device 45, image forming apparatus 100 includes; an engine control substrate 70; a conveying roller 46a and a follower roller 46b included in timing roller 46; and a drive source (for example, a motor) 80 for conveying roller 46a.

Movement amount detecting device 45 includes a light emitter 51, a light receiver 54, an ADC (Analog-to-Digital Converter) 57, and an FPGA 58.

Light emitter 51, light receiver 54, and ADC 57 constitute an image capturer (camera) that generates a plurality of pieces of image data by capturing, at different timings, images of the surface of sheet P conveyed in conveyance path 40 (see FIG. 1).

Light emitter 51 is disposed at a predetermined distance (for example, 5 to 10 mm) from sheet P in conveyance path

40 and at a predetermined angle with respect to sheet P. Light emitter 51 includes a laser light source 52 and a lens 53.

Laser light source 52 outputs laser light (coherent light) with high coherence. Lens 53 is a collimator lens and serves to irradiate sheet P with the laser light output from laser light source 52.

Light receiver 54 is disposed at a position distant away by a predetermined distance (for example, 7 to 12 mm) from sheet P in conveyance path 40. Light receiver 54 includes an image formation lens 56 and an image sensor 55.

Image formation lens 56 is a collimator lens, and forms an image in image sensor 55 using the laser light output from light emitter 51 and reflected by the surface of sheet P.

Image sensor 55 is a two-dimensional sensor in which a plurality of pixels each constituted of a light receiving element are arranged in the form of a matrix. For example, image sensor 55 has 30×30=900 pixels (1 pixel=1/800 inch) arranged in the form of a square. Image sensor 55 captures an image in accordance with a global shutter method in which timings of starting exposure of the plurality of pixels are the same.

Image sensor 55 is disposed such that surfaces of the pixels arranged in the form of a matrix are substantially in parallel with sheet P. Via image formation lens 56, image sensor 55 receives the laser light reflected by the surface of sheet P, thereby capturing an image of the surface of sheet P.

Image sensor 55 outputs image data to ADC 57 at a certain detection cycle (every 100 microseconds, for example). The image data is constituted of an analog voltage signal according to an amount of laser light received in each pixel.

It should be noted that the pixel size and detection cycle in image sensor 55 are not limited to the above-described values and can be changed appropriately. For example, the detection cycle can be changed to 80 microseconds at minimum, and may be changed appropriately in accordance with a type of sheet P or the like.

Whenever image data is received from image sensor 55 at the certain detection cycle, ADC 57 converts the image data into digital image data and outputs the converted image data to FPGA 58.

FPGA 58 operates as a hardware processor, and includes an arithmetical unit 59 for calculating an amount of movement of sheet P per unit time (detection cycle herein). A method of calculating the amount of movement of sheet P by arithmetical unit 59 will be described later. The calculated amount of movement per unit time is output to engine control substrate 70.

Engine control substrate 70 is a substrate on which various types of components for controlling an operation of image forming apparatus 100 are mounted. Engine control substrate 70 includes controller 71 described above and a data storage 72. Data storage 72 is constituted of ROM 102, RAM 103, and storage device 120 shown in FIG. 2.

Controller 71 sets a target speed of each of the photoconductor, the transfer belt, and sheet P in accordance with at least one of the type and basis weight of sheet P, and controls each of the components of image forming apparatus 100 in accordance with the target speed thus set. The target speed is selected from 300 mm/s, 150 mm/s, and 100 mm/s, for example. Controller 71 stores target speed information into data storage 72. The target speed information indicates a currently set target speed.

Moreover, controller 71 compares the target speed with a movement speed value determined based on the amount of movement per unit time from arithmetical unit 59, and controls drive source 80 based on the result of comparison. Accordingly, the movement speed of sheet P becomes stable at the target speed.

Moreover, controller 71 outputs the information stored in data storage 72 so movement amount detecting device 45.

Data storage 72 stores various types of setting information in image forming apparatus 100. Specifically, data storage 72 stores not only the above-described target speed information but also information (hereinafter, sheet type information) indicating type and basis weight of a set sheet P and the like.

[As to Speckle Pattern]

Figure 4:
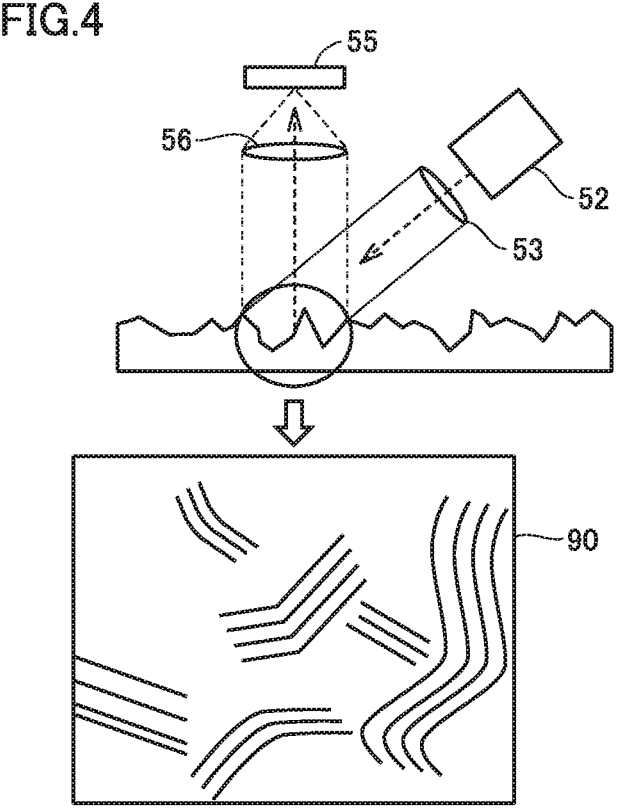
FIG. 4 illustrates a speckle pattern.

With reference to FIG. 4, the following describes a speckle pattern scanned by image sensor 55. FIG. 4 illustrates the speckle pattern.

When viewed microscopically, the surface of sheet P has fine unevenness. When the surface of sheet P is irradiated with laser light (coherent light) with high coherence, the unevenness causes a phase difference among diffuse reflections of light. The magnitude of the phase difference differs depending on a state of the unevenness in a location on the surface. This results in emergence of: a location having a large amount of light with a phase difference close to 0 or a multiple of $2\pi$; and a location having a small amount of light with a phase difference close to $(2m+1)\pi$ (m is an integer).

As a result, the amount of light in each of the pixels included in image sensor 55 and arranged in the form of a matrix is changed according to a state of the surface of sheet P at the portion irradiated with the laser light. Accordingly, an image 90 obtained by image sensor 55 has an interference pattern called "speckle pattern".

Thus, the speckle pattern is determined by the state of the surface of sheet P. The unevenness in the surface of sheet P, which is a cause of the speckle pattern, is formed in various manners due to simply not only the roughness of the surface but also a pattern of a paper fiber, non-uniformity in paper making, and the like.

[Principle of Calculating Amount of Movement]

Figure 5:
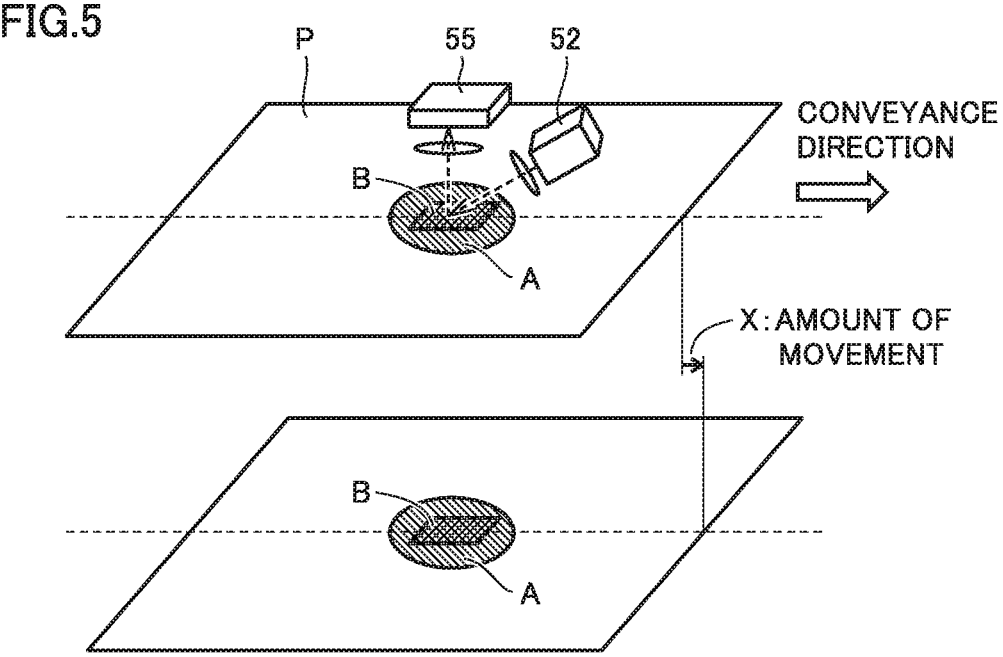
FIG. 5 shows an irradiation region A irradiated with laser light and an image capturing region B in which an image is captured by an image sensor 55, during movement of a sheet.
Figure 6:
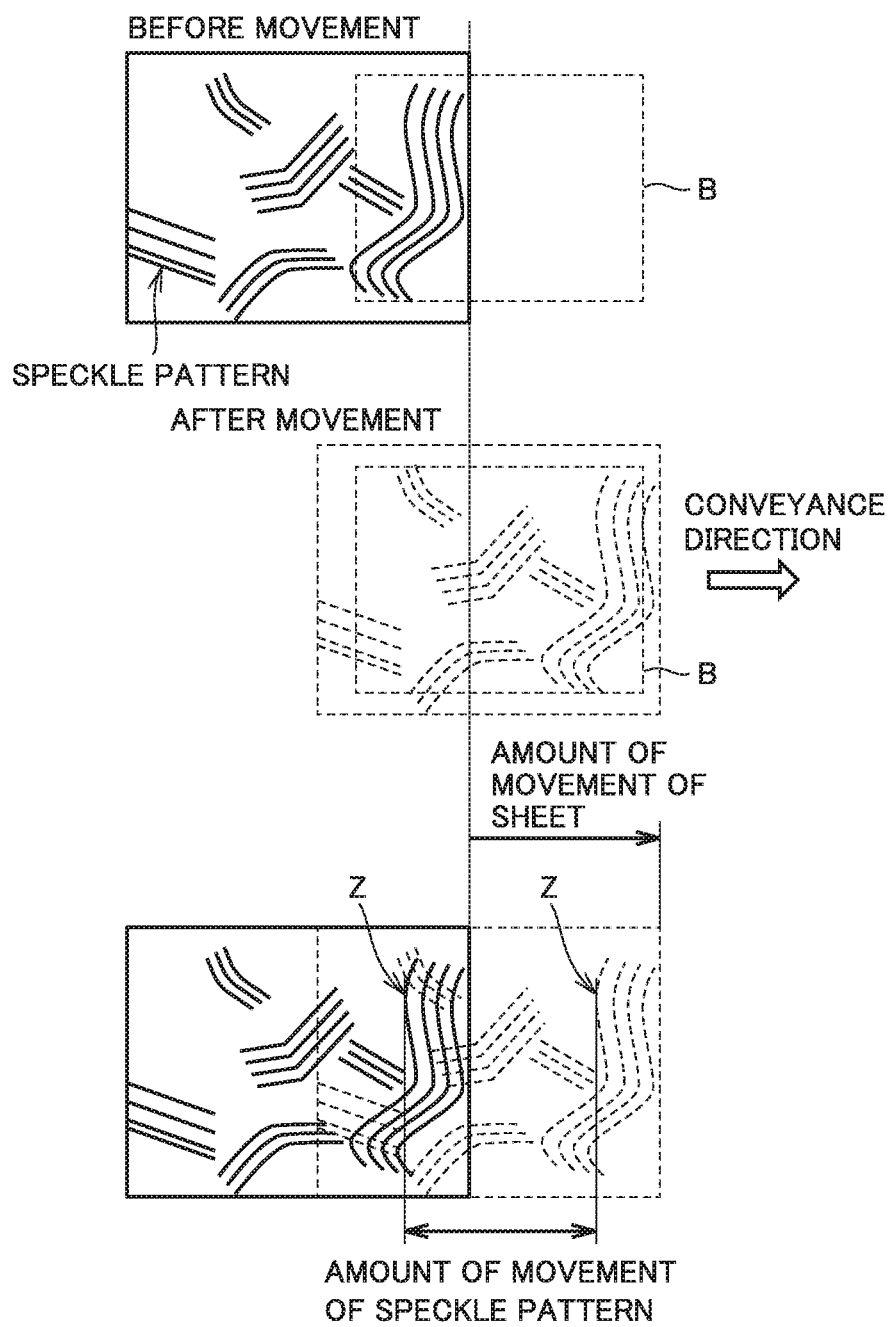
FIG. 6 schematically shows an exemplary image captured by the image sensor.

With reference to FIG. 5 and FIG. 6, the following describes a principle of calculating the amount of movement of sheet P per unit time (detection cycle). FIG. 5 shows an irradiation region A irradiated with laser light and an image capturing region B in which an image is captured by image sensor 55, during movement of sheet P.

The upper portion of FIG. 5 shows a state in which image sensor 55 captures the N-th image of sheet P. The lower portion of FIG. 5 shows a state in which image sensor 55 captures the N+1-th image of sheet P. In other words, the lower port ion of FIG. 5 shows a state of sheet P upon passage of one detection cycle from the state of the upper portion. It should be noted that in FIG. 5, irradiation region A represents a region irradiated with the laser light and image capturing region B represents a region which has a substantially square shape and for which an image is formed in image sensor 55.

The positions of laser light source 52 and image sensor 55 are fixed. Hence, the speckle pattern is not changed when sheet P is not moved, but is changed when sheet P is moved. This is due to the following reason. That is, due to the movement of sheet P, different portions of the unevenness of the surface of sheet P pass through the position irradiated with the laser light at respective points of time and the states of overlapping of the diffuse reflections of light differ at the respective points of time.

FIG. 6 schematically shows exemplary images captured by image sensor 55. The upper portion of FIG. 6 corresponds to the upper portion of FIG. 5, and shows the N-th image captured by image sensor 55 in image capturing region B. The middle portion of FIG. 6 corresponds to the lower portion of FIG. 5, and shows the N+1-th image captured by image sensor 55 in image capturing region B. The lower portion of FIG. 6 shows an image obtained by combining those in the upper and middle portions of FIG. 6.

When sheet P is moved by an amount of movement X during one detection cycle, the speckle pattern is also moved by the amount of movement X between the images captured by image sensor 55. Therefore, the amount of movement of sheet P in one detection cycle can be calculated by: specifying a common speckle pattern (common pattern Z) between the N-th captured image and the N+1-th captured image; and calculating a distance (amount of movement) of specified common pattern Z in image capturing region B. The amount of movement of common pattern Z corresponds to a difference (phase difference) between a phase of common pattern Z in the N-th image and a phase of common pattern Z in the N+1-th image. Therefore, by calculating the phase difference, the amount of movement of sheet P in one detection cycle can be specified. In this way, the amount of movement of sheet P per unit time can be calculated.

[As to Noise Component of Detected Image]

In order to specify a common speckle pattern (common pattern) from two images, it is necessary to specify wave number components included in the images.

Here, the speckle pattern is constituted of a collection of substantially circular, granular spots (speckles) each with a larger amount of light than an amount of light around the spots. In an image captured by image sensor 55, a cycle of speckle pattern is, at minimum, twice as large as a speckle diameter. Therefore, a wave number component higher than a wave number (spatial frequency) corresponding to the cycle twice as large as the speckle diameter becomes noise. It is preferable to calculate the amount of movement of sheet P per unit time after removing the wave number component corresponding to the noise from the image. This is because when the wave number component corresponding to the noise is included, an error is included in the calculated amount of movement.

During movement of sheet P, which is a target to be measured, the shape of the speckle is changed according to the movement speed thereof.

Figure 7:
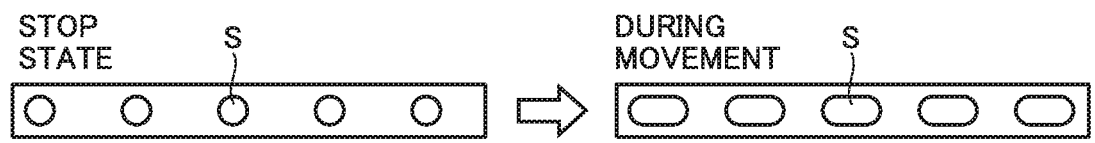
FIG. 7 shows a change in shape of a speckle due to the movement of the sheet.

FIG. 7 shows a change in the shape of the speckle due to movement of sheet P. As shown in FIG. 7, in the stop state of sheet P, speckle S has a substantially circular shape. On the other hand, during movement of sheet P, speckle S has a smaller luminance (becomes darker) than the luminance of speckle S in the stop state of sheet P, is elongated along the direction of traveling of sheet P, and has a substantially elliptical shape. That is, the diameter (speckle diameter) of speckle S becomes larger. Here, the diameter of the speckle is increased from the diameter of the speckle in the stop state of sheet P in accordance with an increase in the movement speed of sheet P. That is, the speckle diameter is changed in accordance with the movement speed of sheet P.

Figure 8:
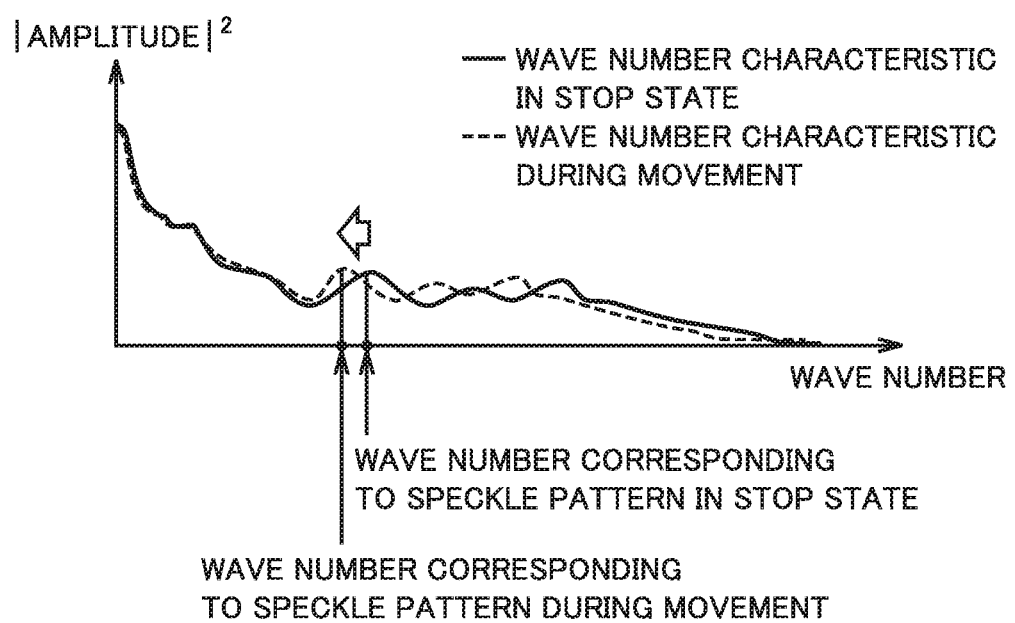
FIG. 8 shows a graph of wave number space data obtained by performing Fast Fourier Transform (FFT) onto image data.

FIG. 8 shows a graph of wave number space data obtained by performing Fast Fourier Transform (FFT) onto the image data. In the graph shown in FIG. 8, the horizontal axis represents a wave number and the vertical axis represents a square of amplitude.

As shown in FIG. 8, it is understood that a peak corresponding to the speckle pattern during the movement of sheet P is shifted to the low wave number side as compared with a peak corresponding to the speckle pattern in the stop state of sheet P. This is because the speckle diameter becomes larger as sheet P is moved as shown in FIG. 7.

As described above, in order to calculate the amount of movement of sheet P per unit time, a component with a wave number smaller than the wave number corresponding to the cycle twice as large as the speckle diameter is required. Hence, it is preferable to remove a wave number component larger than the wave number corresponding to the cycle twice as large as the speckle diameter. Hereinafter, the maximum value of the wave number required to calculate the amount of movement will be referred to as "cutoff value".

However, as shown in FIG. 8, the peak corresponding to the speckle pattern during the movement of sheet P is shifted to the low wave number side as compared with the peak corresponding to the speckle pattern in the stop state of sheet P.

Therefore, for example, if the cutoff value is determined based on the speckle diameter in the stop state of sheet P, the following problem arises. That is, even if a wave number component larger than the cutoff value is removed, unnecessary noise remains in the wave number space data. Accordingly, the amount of movement cannot be measured accurately.

Moreover, if the cutoff value is determined based on the speckle diameter during the movement of sheet P at a specific movement speed, the following problem arises. That is, when sheet P is moved at a movement speed greatly different from the specific movement speed, unnecessary noise remains in wave number space data, or a part of the wave number component corresponding to the speckle pattern is removed from the wave number space data. Accordingly, the amount of movement cannot be measured accurately.

[Internal Configuration of Arithmetical Unit Included in Movement Amount Detecting Device]

Movement amount detecting device 45 of the first embodiment determines the cutoff value in consideration of a change in the speckle diameter according to the movement speed of sheet P, removes the wave number component more than the determined cutoff value from wave number space data, and then calculates the amount of movement of sheet P per unit time. Accordingly, the amount of movement is measured accurately. The following describes an internal configuration of arithmetical unit 59 included in movement amount detecting device 45 with reference to FIG. 9.

Figures 9, 10:
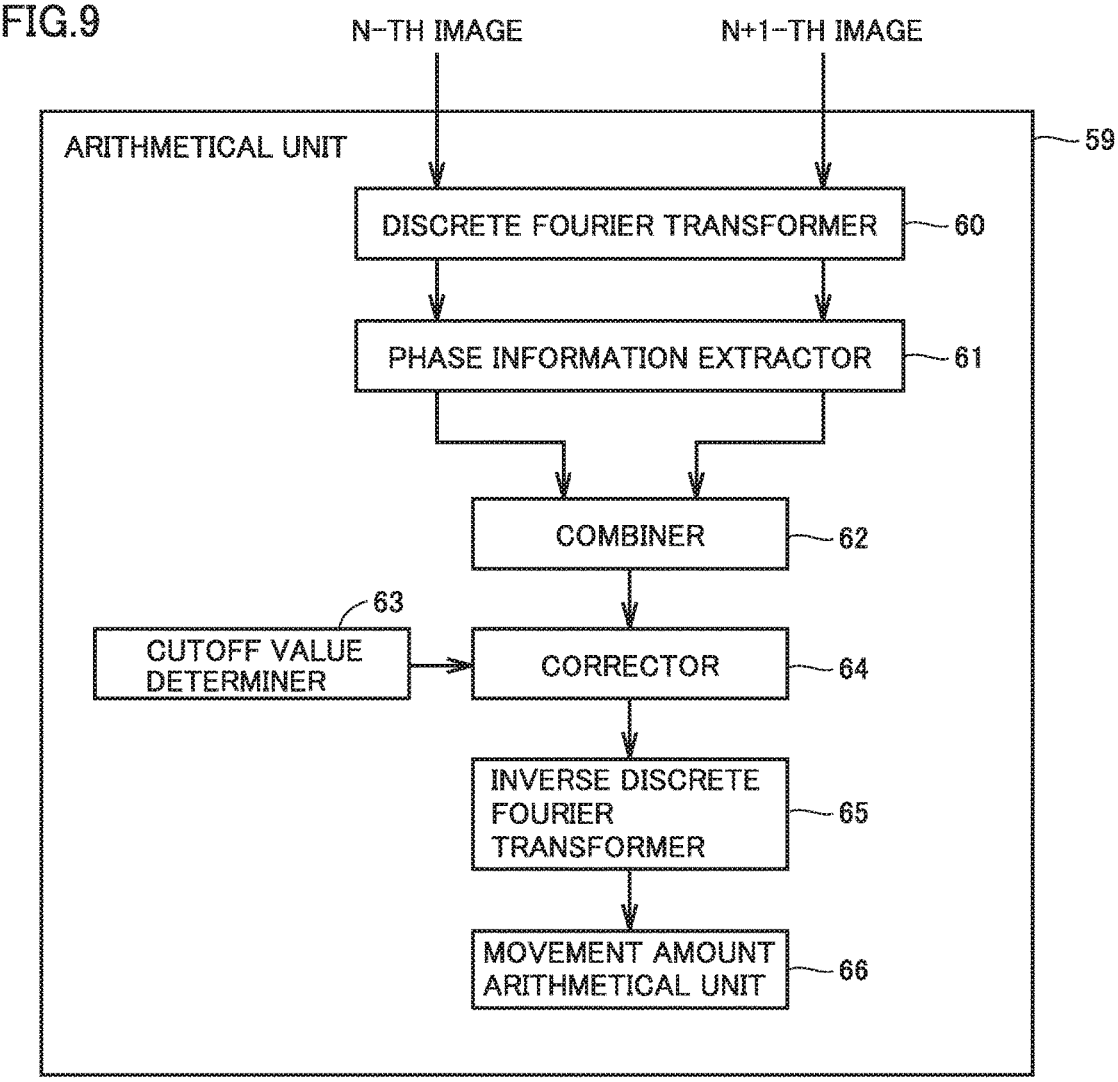
FIG. 9 is a block diagram showing an internal configuration of an arithmetical unit included in the movement amount detecting device of the first embodiment.
FIG. 10 shows an exemplary result of calculating an amount of image change.

FIG. 9 is a block diagram showing the internal configuration of arithmetical unit 59 included in movement amount detecting device 45. As shown in FIG. 9, arithmetical unit 59 includes a discrete Fourier transformer 60, a phase information extractor 61, a combiner 62, a cutoff value determiner 63, a corrector 64, an inverse discrete Fourier transformer 65, and a movement amount arithmetical unit 66.

Discrete Fourier transformer 60 performs Discrete Fourier Transform (DFT) onto real space image data received from ADC 57 to convert it into wave number space data. The real space image data is data indicating a relation between the coordinate position of each pixel and the luminance of the pixel. The wave number space data is data indicating a relation between a wave number and an amplitude, and is data obtained by combining functions $f(k)$ of respective wave number components $k$.

Discrete Fourier transformer 60 performs Discrete Fourier Transform onto both the N-th image and the N+1-th image, and outputs wave number space data obtained from each of the images to phase information extractor 61.

Phase information extractor 61 generates phase data by normalizing the amplitude of each wave number component of the wave number space data received from discrete Fourier transformer 60. Phase information extractor 61 generates respective pieces of phase data for both the N-th image and the N+1-th image, and outputs the generated pieces of phase data to combiner 62.

Combiner 62 generates combined data by combining the respective pieces of phase data of the N-th image and N+1-th image received from phase information extractor 61. Combiner 62 may generate the combined data by multiplying the wave number component of the N-th phase data by the wave number component of the N+1-th phase data. The combined data includes a phase difference between the phase data corresponding to the N-th image and the phase data corresponding to the N+1-th image.

Cutoff value determiner 63 determines the cutoff value in consideration of the change in speckle diameter according to the movement speed of sheet P. Details of the method of determining the cutoff value will be described later.

Corrector 64 generates corrected data by removing, from the combined data received from combiner 62, the wave number component larger than the cutoff value determined by cutoff value determiner 63. Corrector 64 outputs the generated corrected data to inverse discrete Fourier transformer 65. Corrector 64 is constituted of a low-pass filter and permits passage of the wave number component equal to or smaller than the cutoff value, for example.

Inverse discrete Fourier transformer 65 performs Inverse Discrete Fourier Transform (IDFT) onto the corrected data output from corrector 64. Data (hereinafter, referred to as "correlation strength data") generated by inverse discrete Fourier transformer 65 indicates correlation strength between the N-th image and the N+1-th image.

Movement amount arithmetical unit 66 calculates a distance between respective positions to which a peak point and a central point in the correlation strength data generated by inverse discrete Fourier transformer 65 are projected along an axis in the traveling direction or an axis in a direction perpendicular to the traveling direction. Movement amount arithmetical unit 66 obtains the calculated distance as the amount of movement of sheet P in one detection cycle. Movement amount arithmetical unit 66 outputs, to controller 71, the obtained amount of movement of sheet P per detection cycle.

[Method of Determining Cutoff Wave Number]

Cutoff value determiner 63 determines the cut off value in accordance with the following formula (1) in consideration of the change in shape of speckle according to movement of sheet P. Specifically, assuming that a wavelength is represented by (an amount of image change+an image characteristic value), cutoff value determiner 63 determines a wave number corresponding to the wavelength as the cutoff value.

The wavelength corresponding to the cutoff value (wave number)=the amount of image change+ the image characteristic value     Formula (1)

In the formula (1), the term "amount of image change" refers to an amount of change in shape between images captured by image sensor 55 as a result of movement of sheet P. Cutoff value determiner 63 calculates the amount of image change in accordance with the following formula (2):

The amount of image change=the target speed×the exposure time     Formula (2)

In the formula (2), the target speed is a target value of the movement speed of each of the photoconductor, the transfer belt, and sheet P. The target value is set by controller 71.

From data storage 72, controller 71 reads target speed information indicating a currently set target speed. Then, controller 71 outputs the read target speed information to the FPGA of movement amount detecting device 45. In this way, cutoff value determiner 63 obtains the target speed information.

Moreover, the exposure time is a period of time during which each pixel of image sensor 55 receives light in one round of image capturing. For example, the exposure time is 100 μs. The exposure time is determined beforehand in accordance with performances and the like of light receiver 54 and light emitter 51. Cutoff value determiner 63 stores the exposure time beforehand.

Cutoff value determiner 63 calculates the amount of image change in accordance with the above-described formula (2) using the exposure time stored beforehand and the target speed indicated by the target speed information obtained from controller 71.

FIG. 10 shows an exemplary result of calculating the amount of image change by cutoff value determiner 63. As shown in FIG. 10, whenever cutoff value determiner 63 receives different target speed information from controller 71, cutoff value determiner 63 calculates the amount of image change in accordance with this target speed information. Cutoff value determiner 63 stores the size of one pixel beforehand. Based on the size, cutoff value determiner 63 calculates the amount of image change based on a pixel as a unit.

The image characteristic value of the formula (1) above is the speckle diameter calculated from a characteristic of image formation lens 56. Regarding the speckle, various researches have been conducted and it has been known that an average speckle diameter $Sd_{ave}$ at an image formation surface is given by the following formula (3) (for example, "Yasuhiko ARAI, et. al., "High Resolution Electronic Speckle Pattern Interferometry by Using Only Two Speckle Patterns". "Kogaku". Volume 41, Number 2, p 96-104, February, 2012"):

$$Sd_{ave}=1.22\times(1+M)\times\lambda\times F \qquad \text{Formula (3)}$$

In the formula (3), $Sd_{ave}$ represents an average diameter at an image formation surface, M represents a magnification of image formation lens 56, λ represents a wavelength of the laser light, and F represents an F value (value obtained by dividing a focal distance by an aperture diameter) of image formation lens 56.

As the image characteristic value, cutoff value determiner 63 beforehand stores average speckle diameter $Sd_{ave}$ calculated in accordance with the formula (3). Cutoff value determiner 63 determines the cutoff value in accordance with the formula (1).

[Flow of Process of Image Forming Apparatus]

Figure 11:
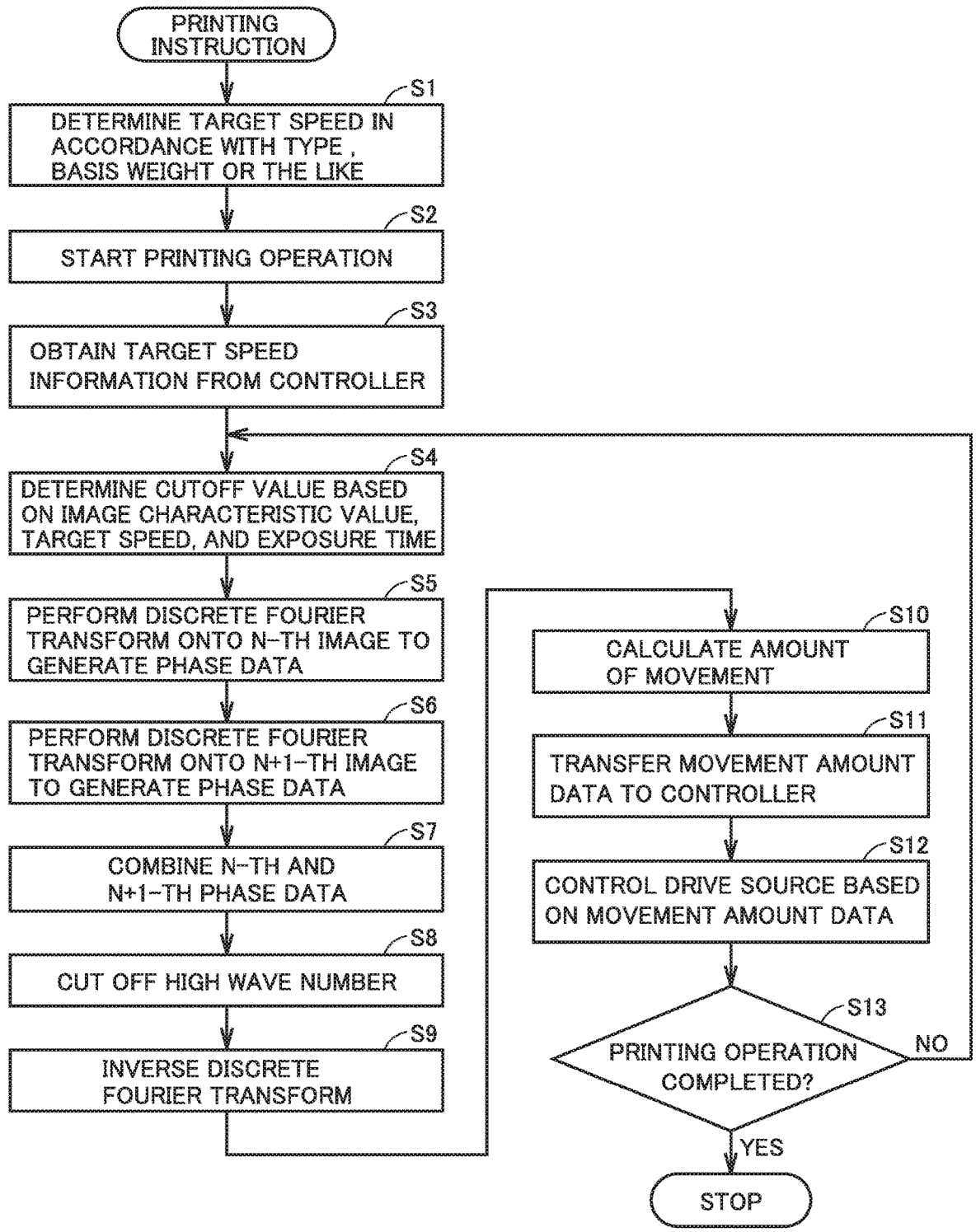
FIG. 11 is a flowchart showing a flow of a printing process in the image forming apparatus of the first embodiment.

Next, with reference to FIG. 11, the following describes a flow of a printing process in image forming apparatus 100. FIG. 11 is a flowchart showing a flow of the printing process in image forming apparatus 100.

As shown in FIG. 11, controller 71 first sets the target speed of each of the photoconductor, the transfer belt, and sheet P in accordance with at least one of type and basis weight of sheet P (step S1). For example, controller 71, which beforehand stores a table in which the type and basis weight of the sheet are correlated with the target speed, may set the target speed based on such a table. Controller 71 stores target speed information indicating the set target speed into delta storage 72.

In accordance with the set target speed, controller 71 controls each component of image forming apparatus 100 to start a printing operation (step S2).

Cutoff value determiner 63 of movement amount detecting device 45 obtains the target speed information from controller 71 (step S3). Moreover, cutoff value determiner 63 determines the cutoff value in accordance with the formulas (1) and (2) based on the target speed indicated by the obtained target speed information and the exposure time and image characteristic value stored beforehand (step S4).

Next, discrete Fourier transformer 60 performs discrete Fourier transform onto the N-th image captured by image sensor 55, thereby generating wave number space data (hereinafter, the wave number space data corresponding to the N-th image is referred to as "N-th wave number space data"). Then, phase information extractor 61 generates phase data by normalizing the amplitude of each wave number component in the N-th wave number space data (hereinafter, the phase data corresponding to the N-th wave number space data will be referred to as "N-th phase data") (step S5).

Likewise, discrete Fourier transformer 60 performs discrete Fourier transform onto the N+1-th image captured by image sensor 55, thereby generating wave number space data (hereinafter, the wave number space data corresponding to the N+1-th image will be referred to as "N+1-th wave number space data"). Then, phase information extractor 61 generates phase data by normalizing the amplitude of each wave number component in the N+1-th wave number space data (hereinafter, the phase data corresponding to the N+1-th wave number space data will be referred to as "N+1-th phase data") (step S6).

Then, combiner 62 generates combined data by combining the N-th phase data and N+1-th phase data generated in steps S5 and S6 (step S7).

Next, corrector 64 generates corrected data by removing, from the combined data generated in step S7, the wave number component larger than the cutoff value determined in step S4 (step S8).

Inverse discrete Fourier transformer 65 performs inverse discrete Fourier transform onto the corrected data obtained in step S8 (step S9).

Then, movement amount arithmetical unit 66 calculates the amount of movement of sheet P per detection cycle based on the positions of the peak point and central point of the data obtained in step S9 (step S10), and outputs the movement amount data indicating the calculated amount of movement to controller 71 (step S11).

Based on the movement amount data received in step S11, controller 71 calculates an actual movement speed of sheet P. Controller 71 compares the calculated actual movement speed with the target speed. Based on the result of comparison, controller 71 controls drive source 80 (see FIG. 3) to attain an actual speed close to the target speed (step S12).

Then, controller 71 determines whether or not the whole of the printing operation is completed (step S13). When the whole of the printing operation is completed (YES in step S13), image forming apparatus 100 ends the printing process. When the whole of the printing operation is not completed (NO in step S13), the printing process is returned to the process of step S4.

[Advantage]

As described above, movement amount detecting device 45 according to the first embodiment includes discrete Fourier transformer 60 that generates the N-th wave number space data by performing discrete Fourier transform onto the N-th image data and that generates the N+1-th wave number space data by performing discrete Fourier transform onto the N+1-th image data. Moreover, movement amount detecting device 45 includes cutoff value determiner 63 that obtains the target speed of sheet P and that determines the cutoff value based on the obtained target speed and the exposure time in image sensor 55. Further, movement amount detecting device 45 includes movement amount arithmetical unit 66 that calculates the amount of movement of sheet P based on the phase difference between the N-th wave number space data and the N+1-th wave number space data in the wave number component smaller than the cutoff value.

Sheet P is moved in accordance with the target speed. By using the target speed having a small difference from the actual movement speed of sheet P, it is possible to determine the cutoff value in accordance with substantially the same change as the change in the speckle diameter caused by the actual movement of sheet P. Moreover, the amount of movement is calculated based on the phase difference between the N-th wave number space data and the N+1-th wave number space data in the wave number component smaller than the cutoff value. Therefore, the amount of movement of sheet P can be measured accurately in a short time.

Specifically, movement amount detecting device 45 further includes: combiner 62 that generates the combined data by combining the N-th wave number space data with the N+1-th wave number space data; and corrector 64 that generates the corrected data by removing the wave number component larger than the cutoff value from the combined data. Movement amount arithmetical unit 66 calculates the amount of movement based on the corrected data. Accordingly, movement amount arithmetical unit 66 can calculate the movement amount of sheet P accurately based on the corrected data from which the noise component has been removed.

Second Embodiment

A movement amount detecting device according to a second embodiment of the present disclosure is a modification of movement amount detecting device 45 according to the first embodiment. Specifically, the movement amount detecting device according to the second embodiment is different from movement amount detecting device 45 according to the first embodiment only in that the movement amount detecting device according to the second embodiment includes an arithmetical unit 59a instead of arithmetical unit 59.

Figure 12:
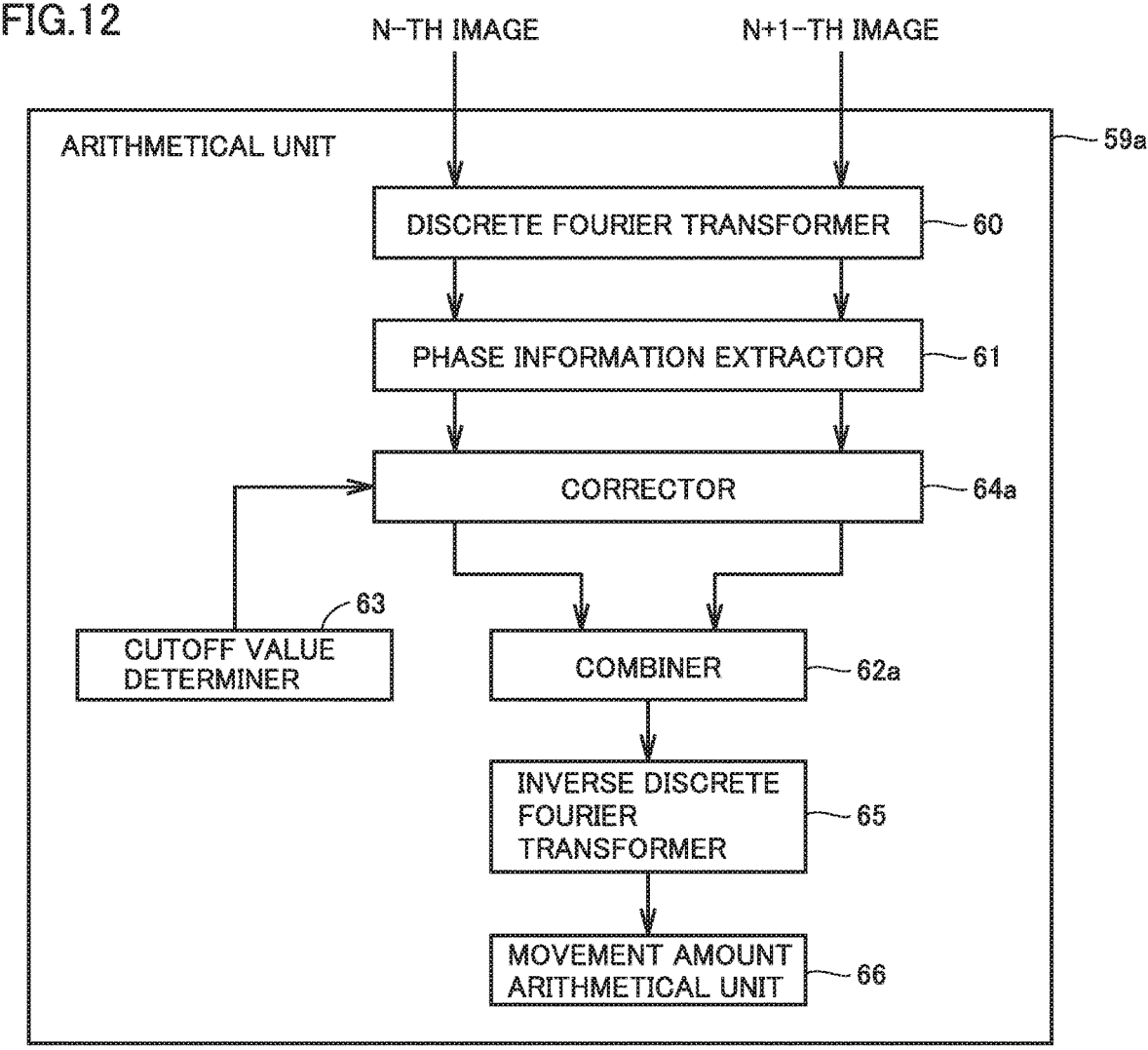
FIG. 12 is a block diagram showing an internal configuration of an arithmetical unit included in a movement amount detecting device of a second embodiment.

With reference to FIG. 12, the following describes an internal configuration of arithmetical unit 59a included in the movement amount detecting device according to the second embodiment. FIG. 12 is a block diagram showing the internal configuration of arithmetical unit 59a included in the movement amount detecting device according to the second embodiment.

As shown in FIG. 12, arithmetical unit 59a is different from arithmetical unit 59 according to the first embodiment in that arithmetical unit 59a includes a corrector 64a and a combiner 62a instead of combiner 62 and corrector 64. The other points are the same as those in the configuration of arithmetical unit 59 shown in FIG. 10. Hence, they will not be repeatedly described.

Corrector 64a generates the N-th corrected data by removing the wave number component larger than the cutoff value from the phase data corresponding to the N-th image output from phase information extractor 61. Likewise, corrector 64a generates the N+1-th corrected data by removing the wave number component larger than the cutoff value from the phase data corresponding to the N+1-th image output from phase information extractor 61. Corrector 64a outputs the N-th corrected data and the N+1-th corrected data to combiner 62a.

Combiner 62a generates the combined data by combining the N-th corrected data and N+1-th corrected data received from correcting unit 64a. Combiner 62a outputs the combined data to inverse discrete Fourier transformer 65.

Figure 13:
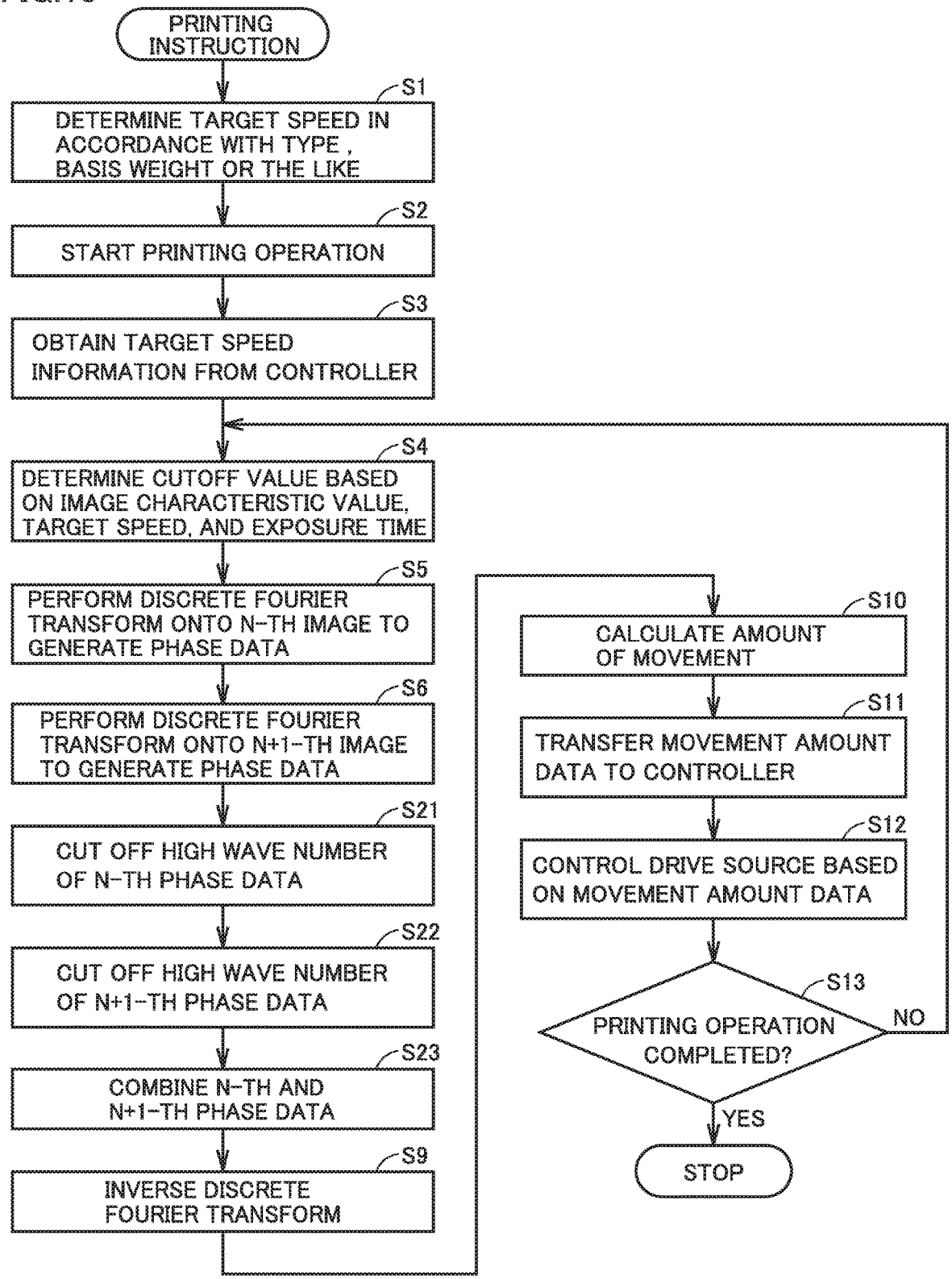
FIG. 13 is a flowchart showing a flow of a printing process in the image forming apparatus of the second embodiment.

Next, with reference to FIG. 13, the following describes a flow of a printing process in the second embodiment. FIG. 13 is a flowchart showing the flow of the printing process in the second embodiment.

As shown in FIG. 13, the printing process in the second embodiment is different from the printing process (see FIG. 11) in the first embodiment in that the printing process includes steps S21 to S23 instead of steps S7 and S8.

In step S21, corrector 64a generates the N-th corrected data by removing the wave number component larger than the cutoff value from the N-th phase data (phase data generated in step S5). Next, corrector 64a generates the N+1-th corrected data by removing the wave number component larger than the cutoff value from the N+1-th phase data (phase data generated in step S6) (step S22).

Then, combiner 62a combines the N-th corrected data generated in step S21 with the N+1-th corrected data generated in step S22 (step S23). By multiplying the wave number component of the N-th corrected data by the wave number component of the N+1-th corrected data, the combined data is generated. Then, a process after S9 is performed based on the combined data generated in step S23.

According to the second embodiment, the wave number component larger than the cutoff value is removed before combining the phase data corresponding to the N-th image with the phase data corresponding to the N+1-th image. That is, the wave number component larger than the cutoff value determined in consideration of the change of shape of the speckle caused due to the movement of sheet P is removed from each of the N-th phase data and the N+1-th phase data. Accordingly, since the noise component is removed, the amount of movement of sheet P can be calculated accurately in a short time also in the second embodiment.

Third Embodiment

A movement amount detecting device according to a third embodiment of the present disclosure is a modification of the movement amount detecting device according to each of the first and second embodiments. In the first and second embodiments, each of correctors 64, 64a of the movement amount detecting devices determines the cutoff value using, as the image characteristic value, average speckle diameter $Sd_{ave}$ that is calculated from the characteristic of image formation lens 56. On the other hand, in the third embodiment, the cut off wave number is determined using, as the image characteristic value, the minimum speckle diameter that is calculated from the characteristic of image formation lens 56.

The sizes of the speckles have a certain degree of distribution. Therefore, there are: speckles each having a diameter larger than average speckle diameter $Sd_{ave}$; and speckles each having a diameter smaller than average speckle diameter $Sd_{ave}$. Therefore, in order to also take into consideration data regarding the speckles each having a diameter smaller than average speckle diameter $Sd_{ave}$, corrector 64 or 64a of the third embodiment determines the cutoff value in accordance with the above-described formulas (1) and (2) using minimum speckle diameter $Sd_{min}$ as the image characteristic value.

It has been known that minimum speckle diameter $Sd_{min}$ in the image formation surface is given by the following formula (4) (see Japanese Laid-Open Patent Publication No. 2010-55064, for example):

$$Sd_{min}=(1+M)\times\lambda\times F \qquad \text{Formula (4)}$$

In the formula (4), M represents the magnification of image formation lens 56, λ represents the wavelength of laser light, and F represents the F value (value obtained by dividing the focal distance by the aperture diameter) of image formation lens 56.

Corrector 64 or 64a may beforehand store, as the image characteristic value, minimum speckle diameter $Sd_{min}$ calculated in accordance with the above-described formula (4), and may determine the cutoff value in accordance with the above-described formulas (1) and (2).

According to the third embodiment, the amount of movement of sheet P per detection cycle can be calculated more accurately.

Fourth Embodiment

In the first embodiment, corrector 64 beforehand stores average speckle diameter $Sd_{ave}$ as the image characteristic value, and determines the cutoff value using the image characteristic value. On the other hand, in an image forming apparatus according to a fourth embodiment, corrector 64 uses, as the image characteristic value, the speckle diameter in the image of sheet P captured by image sensor 55 in the stop state of sheet P.

Figure 14:
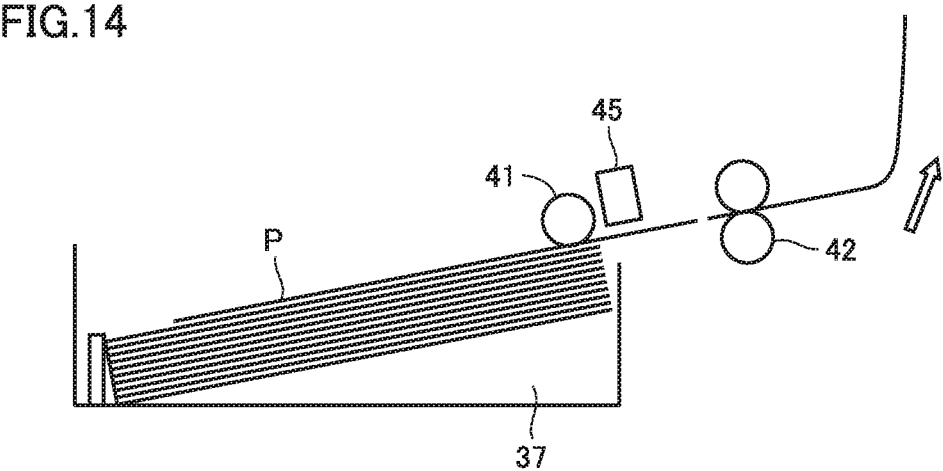
FIG. 14 shows a location of a movement amount detecting device in an image forming apparatus of a fourth embodiment.

FIG. 14 shows a location at which movement amount detecting device 45 in the image forming apparatus according to the fourth embodiment is disposed. As shown in FIG. 14, movement amount detecting device 45 is disposed between pickup roller 41 and feed roller 42. Pickup roller 41 handles sheets P one by one from cassette 37. Feed roller 42 is disposed downstream of pickup roller 41.

Pickup roller 41 conveys one sheet P from cassette 37 by a predetermined distance and then becomes temporarily non-operational. Movement amount detecting device 45 is disposed at a position at which an image of the surface of sheet P conveyed by pickup roller 41 by the predetermined distance can be captured.

Figure 15:
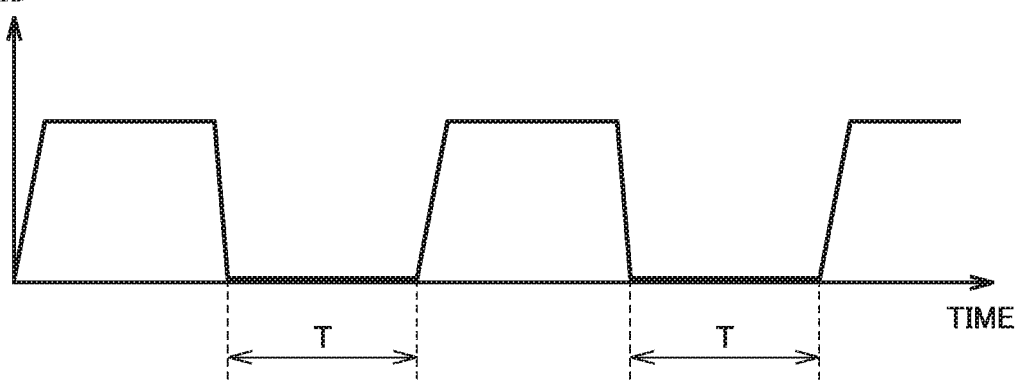
FIG. 15 shows an exemplary rotating speed of a pickup roller.

FIG. 15 shows an exemplary rotating speed of pickup roller 41. As shown in FIG. 15, on-duty of pickup roller 41 is 50% and there are an ON period and an OFF period T. OFF period T is started at a timing at which pickup roller 41 conveys sheet P by the predetermined distance from cassette 37.

Light emitter 51 of movement amount detecting device 45 emits laser light to sheet P when pickup roller 41 is in OFF period T. Image sensor 55 receives diffuse reflections of light from sheet P and captures an image of the surface of sheet P, thereby obtaining a stop-state image.

Cutoff value determiner 63 of movement amount detecting device 45 specifies a speckle diameter based on the stop-state image captured in OFF period T of pickup roller 41, and uses the specified speckle diameter as the image characteristic value. Cutoff value determiner 63 determines the cutoff value in accordance with the above-described formula (1) based on the image characteristic value in the same manner as in the first embodiment.

As a method of calculating the speckle diameter from the stop-state image of sheet P, cutoff value determiner 63 can use various methods. For example, cutoff value determiner 63 may binarize a luminance indicated by real space image data in accordance with a predetermined threshold value, and uses, as lie speckle diameter, the diameter of a spot having a luminance equal to or more than the predetermined threshold value. Alternatively, cutoff value determiner 63 may convert the real space image data into wave number space image data, and then may calculate the speckle diameter using the Fast Fourier Transform (FFT).

Figure 16:
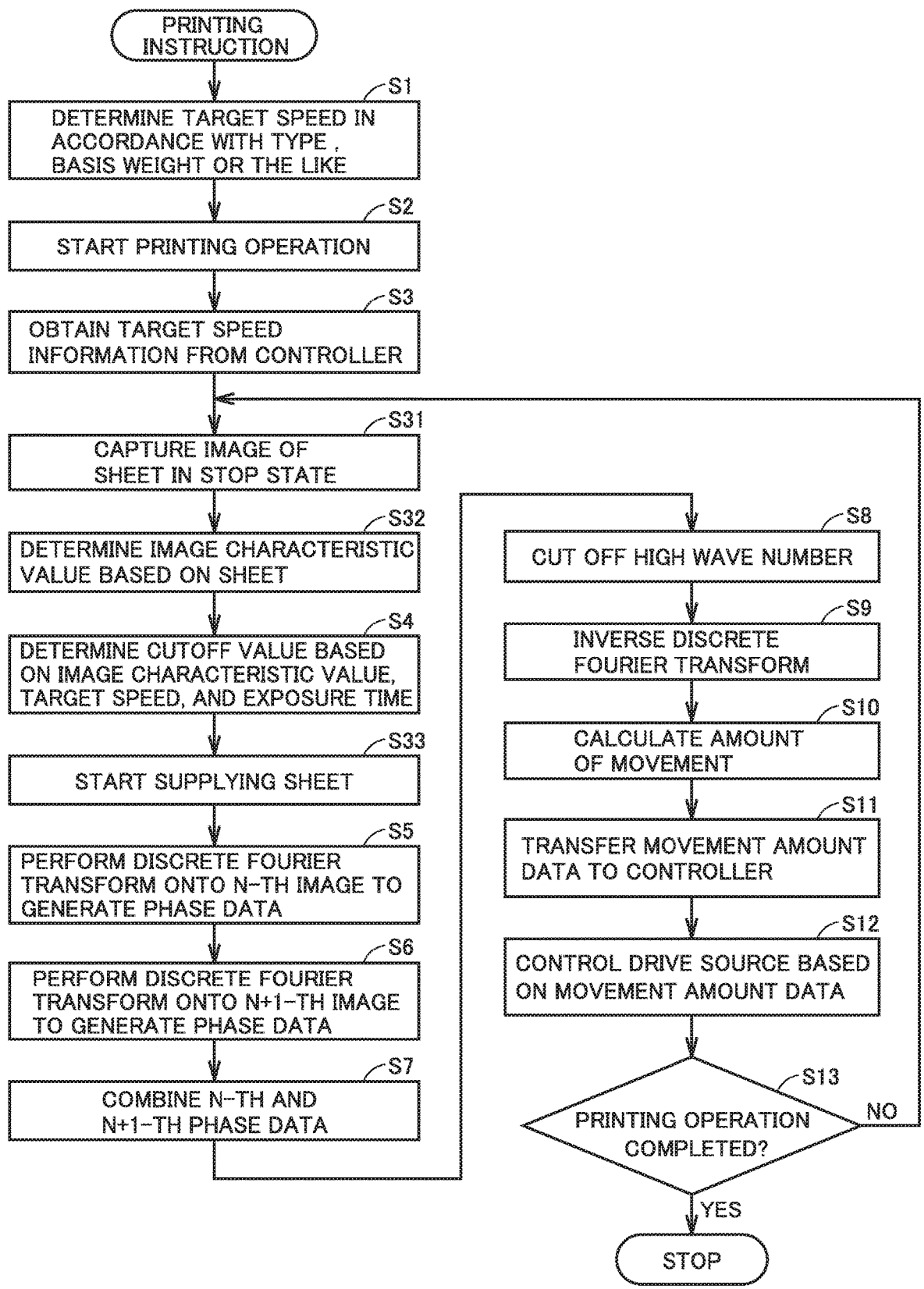
FIG. 16 is a flowchart showing a flow of a printing process in the image forming apparatus of the fourth embodiment.

Next, with reference to FIG. 16, the following describes a flow of a printing process in a fourth embodiment. FIG. 16 is a flowchart showing the flow of the printing process in the fourth embodiment.

As shown in FIG. 16, the printing process in the fourth embodiment is different from the printing process (see FIG. 11) in the first embodiment in that the printing process in the fourth embodiment includes: steps S31, S32 between step S3 and step S4; and a step S33 between step S4 and step S5.

In step S31, image sensor 55 captures an image of the surface of sheet P in OFF period T during which pickup roller 41 is stopped. Cutoff value determiner 63 calculates the speckle diameter from the image captured in step S31, and uses the calculated speckle diameter as the image characteristic value (step S32).

Accordingly, in step S4, cutoff value determiner 63 can determine the cutoff value in the same manner as in the first embodiment based on the image characteristic value calculated in step S32, the target speed information obtained in step S3, and the exposure time stored beforehand.

After step S4, controller 71 rotates pickup roller 41 to start conveyance of sheet P (step S33). Then, the processes of steps S5 to S13 described in the first embodiment are performed. It should be noted that in the fourth embodiment, when it is YES in step S13, the printing process is returned to the process of step S31.

Fifth Embodiment

An image forming apparatus according to a fifth embodiment is a modification of the image forming apparatus according to the fourth embodiment and forms an image on a continuous sheet of paper.

Figure 17:
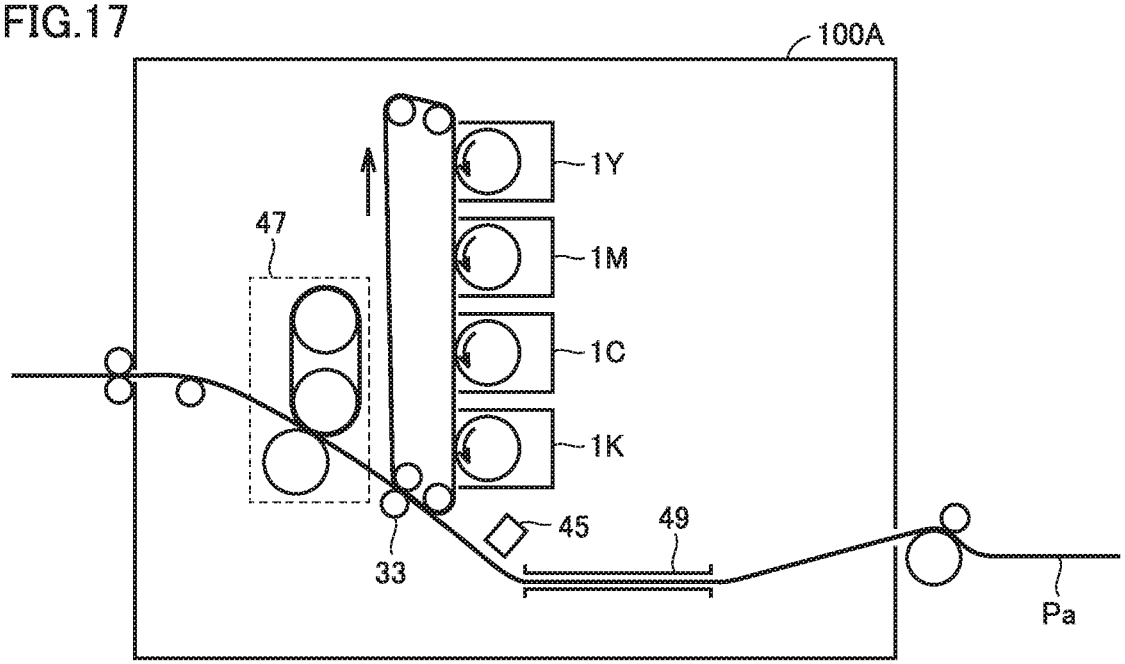
FIG. 17 shows an internal configuration of an image forming apparatus of a fifth embodiment.

With reference to FIG. 17, the following describes an internal configuration of an image forming apparatus 100A according to the fifth embodiment. FIG. 17 shows the internal configuration of image forming apparatus 100A according to the fifth embodiment.

As shown in FIG. 17, as with image forming apparatus 100 according to the first embodiment, image forming apparatus 100A includes image forming units 1Y to 1K, secondary transfer roller 33, and fixing device 47. Moreover, image forming apparatus 100A includes: a guide plate 49 that guides conveyance of a continuous sheet of paper Pa; and movement amount detecting device 45 disposed downstream of guide plate 49. It should be noted that the position of movement amount detecting device 45 is not limited to the position shown in FIG. 17. Movement amount detecting device 45 may be disposed at any position as long as an image of a surface of continuous sheet of paper Pa can be captured.

As with the fourth embodiment, cutoff value determiner 63 of movement amount detecting device 45 calculates a speckle diameter based on image data obtained by capturing an image of the surface of continuous sheet of paper Pa in the stop state of continuous sheet of paper Pa, and determines a cutoff value based on the calculated speckle diameter.

Figure 18:
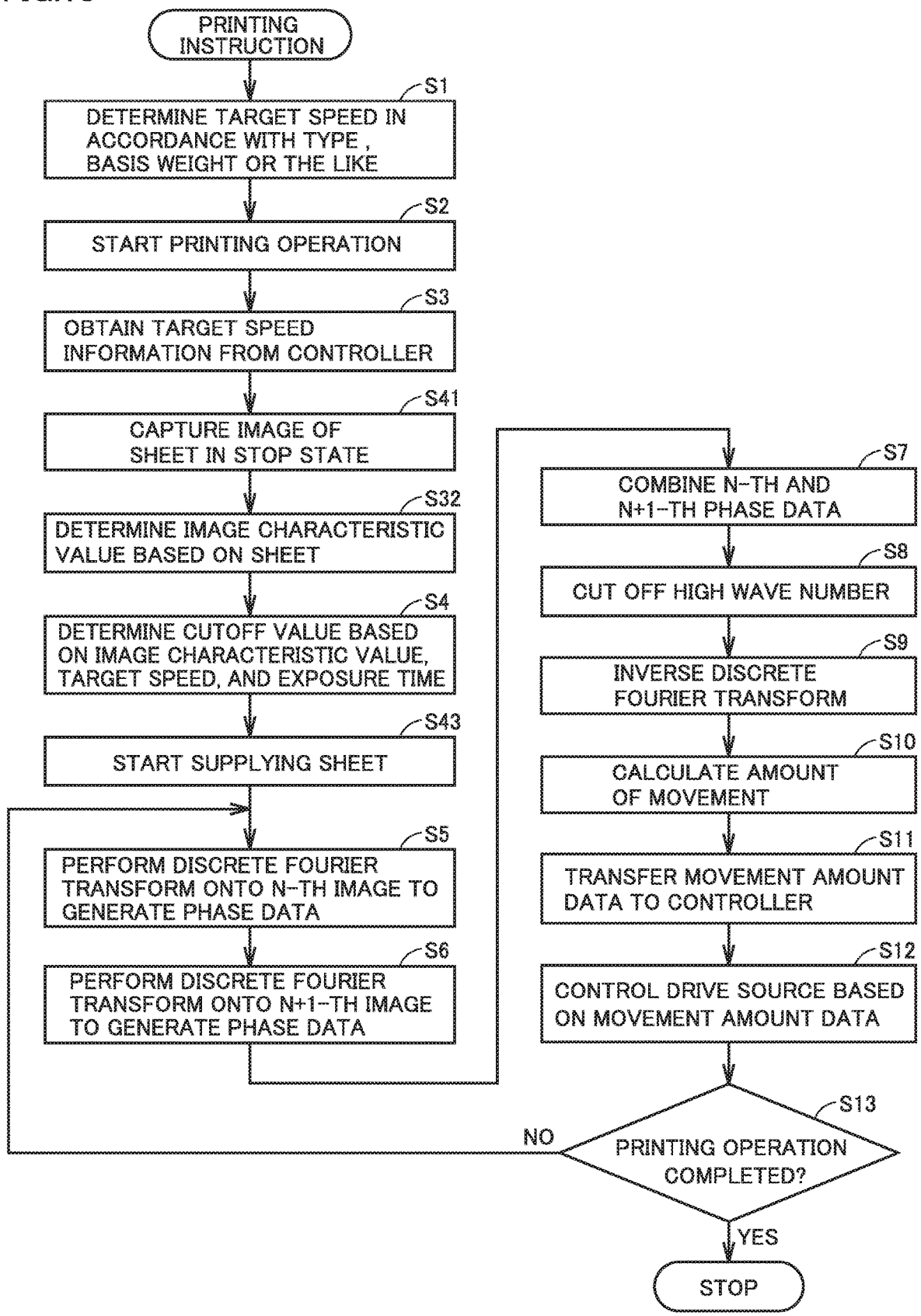
FIG. 18 is a flowchart showing a flow of a printing process in the image forming apparatus of the fifth embodiment.

Next, with reference to FIG. 18, the following describes a flow of the printing process in the fifth embodiment. FIG. 18 is a flowchart showing the flow of the printing process in the fifth embodiment.

As shown in FIG. 18, the printing process in the fifth embodiment is different from the printing process (see FIG. 16) in the fourth embodiment in that the printing process in the fifth embodiment includes a step S41 instead of step S31 and includes a step S43 instead of step S33.

In step S41, image sensor 55 captures an image of the surface of continuous sheet of paper Pa that does not start, to be conveyed. Then, in the same manner as in the fourth embodiment, cutoff value determiner 63 calculates a speckle diameter based on the image obtained by the image capturing in step S41, and uses the calculated speckle diameter as the image characteristic value (step S32).

After the cutoff value is determined (step S4), controller 71 starts conveyance of continuous sheet of paper Pa (step S43). Then, the process of steps S5 to S13 described in the first embodiment is performed.

It should be noted that when continuous sheet of paper Pa is used, the same type of sheet is used from the start to end of the image formation. Therefore, in the fifth embodiment, when it is YES in step S13, the printing process is returned to the process of step S5.

Moreover, step S41 may be performed during warm-up of image forming apparatus 100A or during an operation thereof for stabilization.

[Modification]

Cutoff value determiner 63 may adjust the cutoff value based on the amount of movement per detection cycle determined by movement amount arithmetical unit 66. Specifically, cutoff value determiner 63 calculates an actual movement speed of sheet P based on the movement amount per detection cycle determined by movement amount arithmetical unit 66. Cutoff value determiner 63 adjusts the cutoff value by multiplying a coefficient by the yet-to-be-corrected cutoff value in accordance with the following formula (5), the coefficient being a value (the target speed/the actual movement speed) obtained by dividing the target speed by the actual movement speed:

The adjusted cutoff value=(the yet-to-be-adjusted cut off value)×(the target speed/the actual movement speed)　　　Formula (5)

Accordingly, movement amount detecting device 45 can detect the amount of movement more accurately in consideration of the actual movement speed.

Moreover, in the above-described description, image sensor 55 captures an image in accordance with the global shutter method. However, image sensor 55 may capture an image in accordance with a rolling shutter method. However, in this case, laser light source 52 preferably emits laser light only during a period of time in which all the pixels in image sensor 55 are exposed to light. Accordingly, image sensor 55 can generate the image captured during the period of time in which all the pixels are exposed to light.

Moreover, in the description above, movement amount detecting device 45 detects the amount of movement of sheet P per detection cycle. However, a target to be detected by movement amount detecting device 45 is not limited to the amount of movement of sheet P. For example, movement amount detecting device 45 may detect an amount of movement of feed roller 42, conveying roller 43, timing roller 46, or transfer belt 30 by capturing an image of a surface of feed roller 42, conveying roller 43, timing roller 46, or transfer belt 30.

Moreover, in the description above, corrector 64 or 64a of movement amount detecting device 45 removes the wave number component larger than the cutoff value, and permits passage of the wave number component equal to or smaller than the cutoff value. However, from the data to be processed, corrector 64 or 64a may remove the wave number component larger than the cutoff value and may remove the wave number component smaller than a predetermined wave number (wave number smaller than the cutoff value). In this case, corrector 64 or 64a is constituted of a band-pass filter.

Particularly, when luminance differs between the central portion of the image and the end portion of the image in the image capturing region of image sensor 55 due to a directional characteristic of laser light source 52, it is considered that a wave number component for which one wavelength corresponds to the one side of the substantially square-shaped image capturing region B (see FIG. 5) is superimposed on the image data as noise. Therefore, from the data to be processed, corrector 64 or 64a may remove a wave number component for which one cycle of wavelength corresponds to one side of image capturing region B (see FIG. 5) or may remove a wave number component smaller than a wave number component for which two cycles of wavelength correspond to the one side thereof.

Moreover, in the description above, cutoff value determiner 63 stores a predetermined exposure time. However, the exposure time in image sensor 55 can be changed appropriately in accordance with variation among individual image sensors 55 and reduced sensitivity due to deterioration with passage of time. When the exposure time is changed, cutoff value determiner 63 may determine a cutoff value using the changed exposure time.

For example, controller 71 may measure a period of use of image sensor 55 and may change the exposure time of image sensor 55 in accordance with the period of use. In doing so, controller 71 also changes the exposure time stored in cutoff value determiner 63.

Moreover, in the description above, each of arithmetical units 59, 59a includes phase information extractor 61. However, each of arithmetical units 59, 59a may not include phase information extractor 61. As described above, phase information extractor 61 normalizes the amplitude of each wave number component. Accordingly, the amplitude can be disregarded in the phase data output from phase information extractor 61. When phase information extractor 61 is not provided, movement amount arithmetical unit 66 may calculate the amount of movement in accordance with both an amplitude difference between the data corresponding to the N-th image and the data corresponding to the N+1-th image and a phase difference therebetween.

As described above, a movement amount detecting device reflecting one aspect of the present disclosure comprises an image capturer that generates first image data and second image data by capturing images of a movable object at different timings during movement of the movable object: a discrete Fourier transformer that generates first wave number space data by performing discrete Fourier transform onto the first image data and generates second wave number space data by performing discrete Fourier transform onto the second image data; a determiner that obtains a target speed of the movable object and determines a cutoff value based on the obtained target speed and an exposure time in the image capturer; and a movement amount arithmetical unit that calculates an amount of movement of the movable object based on a phase difference between the first wave number space data and the second wave number space data in a wave number component smaller than the cutoff value.

Preferably, the movement amount detecting device further comprises: a combiner that generates combined data by combining the first wave number space data with the second wave number space data; and a corrector that generates corrected data by removing a wave number component larger than the cutoff value from the combined data. The movement amount arithmetical unit calculates the amount of movement based on the corrected data.

Preferably, the movement amount detecting device further includes a corrector that generates first corrected data by removing a wave number component larger than the cutoff value from the first wave number space data and generates second corrected data by removing the wave number component larger than the cutoff value from the second wave number space data. The movement amount arithmetical unit calculates the amount of movement based on a phase difference between the first corrected data and the second corrected data.

Preferably, the corrector is a low-pass filter or a band-pass filter.

Preferably, the image capturer includes: a light emitter that emits laser light to the movable object; an image sensor having a plurality of light receiving elements each receiving light from the movable object; and an image formation lens that forms an image in the image sensor using the light from the movable object. The determiner uses the target speed, the exposure time, and a speckle diameter calculated from a characteristic of the image formation lens to calculate a value in accordance with a formula "the target speed×the exposure time+the speckle diameter", employs the calculated value as a wavelength, and determines a wave number corresponding to the wavelength as the cutoff value.

Preferably, the speckle diameter is calculated in accordance with $\alpha \times (1+M) \times \lambda \times F$, where $\lambda$ represents a wavelength of the laser light, M represents a magnification of the image formation lens, F represents an F value of the image formation lens, and $\alpha$ represents a predetermined coefficient.

Preferably, the image capturer generates a third image by capturing an image of the movable object in a stop state of the movable object. The determiner uses the target speed, the exposure time, and a speckle diameter included in the third image to calculate a value in accordance with a formula "the target speed×the exposure time+the speckle diameter", employs the calculated value as a wavelength, and determines a wave number corresponding to the wavelength as the cutoff value.

Preferably, the determiner adjusts the cutoff value based on the amount of movement calculated by the movement amount arithmetical unit.

Preferably, the image capturer includes a light emitter that emits laser light to the movable object, and an image sensor having a plurality of light receiving elements each receiving light from the movable object. The image capturer generates the first image data and the second image data based on an amount of light received by each light receiving element when the plurality of light receiving elements simultaneously receive the light.

To achieve at least one of the abovementioned objects, an image forming apparatus reflecting one aspect of the present disclosure comprises: a conveyer that conveys a recording medium; a transfer belt on which a toner image is formable, the transfer belt transferring the toner image onto the recording medium; and the above-described movement amount detecting device. The movable object is one of the recording medium, the conveyer, and the transfer belt.

Preferably, the image forming apparatus further comprises a controller that sets the target speed in accordance with at least one of type and basis weight of the recording medium. The determiner obtains the target speed from the controller.

To achieve at least one of the abovementioned objects, a movement amount detecting method reflecting one aspect of the present disclosure comprises: generating first image data and second image data by capturing images of a movable object at different timings during movement of the movable object; generating first wave number space data by performing discrete Fourier transform onto the first image data and generating second wave number space data by performing discrete Fourier transform onto the second image data; obtaining a target speed of the movable object and determining a cutoff value based on the obtained target speed and an exposure time in the image capturing for generating the first image data and the second image data; and calculating an amount of movement of the movable object based on a phase difference between the first wave number space data and the second wave number space data in a wave number component smaller than the cutoff value.

Although embodiments of the present invention have been described and illustrated in detail, it is clearly understood that the same is by way of illustration and example only and not limitation, the scope of the present invention should be interpreted by terms of the appended claims.

What is claimed is:

1. A movement amount detecting device comprising:
    an image capturer that generates first image data and second image data by capturing images of a movable object at different timings during movement of the movable object, wherein the image capturer includes an image sensor having a plurality of light receiving elements each constituting a pixel and each receiving light from the movable object; and
    a hardware processor that:
        generates first wave number space data by performing discrete Fourier transform onto the first image data and generates second wave number space data by performing discrete Fourier transform onto the second image data,
        obtains a target speed of the movable object,
        uses the obtained target speed, an exposure time in the image capturer, and a speckle diameter to calculate a value in accordance with a formula
        the target speed×the exposure time+the speckle diameter, employs the calculated value as a wavelength, and determines a wave number corresponding to the wavelength as a cutoff wave number, wherein the exposure time is a period of time during which each pixel of the image sensor receives light in one round of image capturing, and
        calculates an amount of movement of the movable object based on a phase difference between the first wave number space data and the second wave number space data in a wave number component smaller than the cutoff wave number,
    wherein the hardware processor obtains the target speed from a controller which controls a drive source which moves the movable object in accordance with the target speed.

2. The movement amount detecting device according to claim 1, wherein:
    the hardware processor generates combined data by combining the first wave number space data with the second wave number space data,
    the hardware processor generates corrected data by removing a wave number component larger than the cutoff wave number from the combined data, and the hardware processor calculates the amount of movement based on the corrected data.

3. The movement amount detecting device according to claim 2, wherein the hardware processor generates the corrected data using a low-pass filter or a band-pass filter.

4. The movement amount detecting device according to claim 1, wherein:
    the hardware processor generates first corrected data by removing a wave number component larger than the cutoff wave number from the first wave number space data and generates second corrected data by removing the wave number component larger than the cutoff wave number from the second wave number space data, and
    the hardware processor calculates the amount of movement based on a phase difference between the first corrected data and the second corrected data.

5. The movement amount detecting device according to claim 1,
    wherein the image capturer further includes:
        a light emitter that emits laser light to the movable object; and
        an image formation lens that forms an image in the image sensor using the light from the movable object, and
    wherein the speckle diameter is calculated from a characteristic of the image formation lens.

6. The movement amount detecting device according to claim 5, wherein the speckle diameter is calculated in accordance with $\alpha \times (1+M) \times \lambda \times F$, where $\lambda$ represents a wavelength of the laser light, M represents a magnification of the image formation lens, F represents an F value of the image formation lens, and $\alpha$ represents a predetermined coefficient.

7. The movement amount detecting device according to claim 1, wherein:
    the image capturer generates third image data by capturing an image of the movable object in a stop state of the movable object, and
    the hardware processor uses, as the speckle diameter, a speckle diameter included in the image indicated by the third image data.

8. The movement amount detecting device according to claim 1, wherein the hardware processor adjusts the cutoff wave number based on the amount of movement.

9. The movement amount detecting device according to claim 1, wherein:
    the image capturer further includes a light emitter that emits laser light to the movable object, and
    the image capturer generates the first image data and the second image data based on an amount of light received by each light receiving element when the plurality of light receiving elements simultaneously receive the light.

10. An image forming apparatus comprising:
    a conveyer that conveys a recording medium;
    a transfer belt on which a toner image is formable, the transfer belt transferring the toner image onto the recording medium; and
    a movement amount detecting device comprising:
        an image capturer that generates first image data and second image data by capturing images of a movable object at different timings during movement of the movable object, wherein the image capturer includes an image sensor having a plurality of light receiving elements each constituting a pixel and each receiving light from the movable object; and a hardware processor that:
generates first wave number space data by performing discrete Fourier transform onto the first image data and generates second wave number space data by performing discrete Fourier transform onto the second image data,
obtains a target speed of the movable object,
uses the obtained target speed, an exposure time in the image capturer, and a speckle diameter to calculate a value in accordance with a formula
the target speed×the exposure time+the speckle diameter, employs the calculated value as a wavelength, and determines a wave number corresponding to the wavelength as a cutoff wave number, wherein the exposure time is a period of time during which each pixel of the image sensor receives light in one round of image capturing, and
calculates an amount of movement of the movable object based on a phase difference between the first wave number space data and the second wave number space data in a wave number component smaller than the cutoff wave number,
wherein the movable object is one of the recording medium, the conveyer, and the transfer belt;
wherein the image forming apparatus further comprises:
a drive source for moving the movable object; and
a controller which controls the drive source based on the calculated amount of movement; and
wherein the hardware processor obtains the target speed from the controller, and wherein the controller controls the drive source to move the movable object in accordance with the target speed.

11. The image forming apparatus according to claim 10, wherein the controller sets the target speed in accordance with at least one of type and basis weight of the recording medium.

12. A movement amount detecting method comprising:
generating, with an image capturer, first image data and second image data by capturing images of a movable object at different timings during movement of the movable object, wherein the image capturer includes an image sensor having a plurality of light receiving elements each constituting a pixel and each receiving light from the movable object;
generating first wave number space data by performing discrete Fourier transform onto the first image data and generating second wave number space data by performing discrete Fourier transform onto the second image data;
obtaining a target speed of the movable object;
using the obtained target speed, an exposure time in the image capturer for generating the first image data and the second image data, and a speckle diameter to calculate a value in accordance with a formula
the target speed×the exposure time+the speckle diameter, employing the calculated value as a wavelength, and determining a wave number corresponding to the wavelength as a cutoff wave number, wherein the exposure time is a period of time during which each pixel of the image sensor receives light in one round of image capturing; and
calculating an amount of movement of the movable object based on a phase difference between the first wave number space data and the second wave number space data in a wave number component smaller than the cutoff wave number, wherein the target speed is obtained from a controller which controls a drive source which moves the movable object in accordance with the target speed.

13. The movement amount detecting method according to claim 12, further comprising:
generating combined data by combining the first wave number space data with the second wave number space data;
generating corrected data by removing a wave number component larger than the cutoff wave number from the combined data; and
calculating the amount of movement based on the corrected data.

14. The movement amount detecting method according to claim 13, wherein the corrected data is generated using a low-pass filter or a band-pass filter.

15. The movement amount detecting method according to claim 12, further comprising:
generating first corrected data by removing a wave number component larger than the cutoff wave number from the first wave number space data and generating second corrected data by removing the wave number component larger than the cutoff wave number from the second wave number space data; and
calculating the amount of movement based on a phase difference between the first corrected data and the second corrected data.

16. The movement amount detecting method according to claim 12, further comprising:
generating the first image data and the second image data using a light emitter, the image sensor, and an image formation lens, the light emitter emitting laser light to the movable object, the image sensor having the plurality of light receiving elements each receiving light from the movable object, the image formation lens forming an image in the image sensor using the light from the movable object;
wherein the speckle diameter is calculated from a characteristic of the image formation lens.

17. The movement amount detecting method according to claim 16, wherein the speckle diameter is calculated in accordance with $\alpha \times (1+M) \times \lambda \times F$, where $\lambda$ represents a wavelength of the laser light, M represents a magnification of the image formation lens, F represents an F value of the image formation lens, and $\alpha$ represents a predetermined coefficient.

18. The movement amount detecting method according to claim 12, further comprising:
generating third image data by capturing an image of the movable object in a stop state of the movable object; and
using, as the speckle diameter, a speckle diameter included in the image indicated by the third image data.

19. The movement amount detecting method according to claim 12, wherein the cutoff wave number is adjusted based on the amount of movement.

20. The movement amount detecting method according to claim 12, further comprising generating the first image data and the second image data using a light emitter that emits laser light to the movable object and the image sensor having the plurality of light receiving elements each receiving light from the movable object, based on an amount of light received by each light receiving element when the plurality of light receiving elements simultaneously receive the light.

* * * * *